(12) United States Patent
Zhang et al.

(10) Patent No.: US 12,045,536 B2
(45) Date of Patent: Jul. 23, 2024

(54) ALWAYS ON DISPLAY METHOD AND ELECTRONIC DEVICE

(71) Applicant: Honor Device Co., Ltd., Guangdong (CN)

(72) Inventors: Xiaohang Zhang, Shenzhen (CN); Liwei Huang, Shenzhen (CN); Shishu Yang, Shenzhen (CN); Jie Ren, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/299,496

(22) Filed: Apr. 12, 2023

(65) Prior Publication Data

US 2023/0251814 A1 Aug. 10, 2023

Related U.S. Application Data

(63) Continuation of application No. PCT/CN2022/073285, filed on Jan. 21, 2022.

(30) Foreign Application Priority Data

Mar. 26, 2021 (CN) .......................... 202110326190.6

(51) Int. Cl.
*G06F 3/147* (2006.01)
*G06F 1/3234* (2019.01)
(Continued)

(52) U.S. Cl.
CPC ............ *G06F 3/147* (2013.01); *G06F 1/3265* (2013.01); *G06F 3/0488* (2013.01); *G06T 13/80* (2013.01); *G06F 3/012* (2013.01); *G06F 3/013* (2013.01)

(58) Field of Classification Search
CPC ..... G06F 3/03543; G06F 3/013; G06F 1/3265
See application file for complete search history.

(56) References Cited

U.S. PATENT DOCUMENTS 9,197,738 B2 11/2015 Peev et al.
10,423,379 B2 9/2019 Li
(Continued)

FOREIGN PATENT DOCUMENTS

CN 109361593 A 2/2019
CN 112363785 A 2/2021
(Continued)

*Primary Examiner* — Van N Chow
(74) *Attorney, Agent, or Firm* — Leydig, Voit & Mayer, Ltd.

(57) ABSTRACT

An always on display method and an electronic device are provided and relate to the field of terminal technologies, to perform always on display according to a usage status of the electronic device, so that the usage status of the electronic device is vividly and effectively conveyed to a user in a screen-off state, making always on display content more real-time and interesting. The method includes: receiving, by an electronic device, a screen-off event; in response to the screen-off event, entering, by the electronic device, a screen-off state; and displaying, by the electronic device, a first target screen-off animation in a first display area, where the first target screen-off animation is associated with usage data of the electronic device, and the usage data is used to indicate a usage status of the electronic device.

20 Claims, 19 Drawing Sheets

(51) Int. Cl.
*G06F 3/0488* (2022.01)
*G06T 13/80* (2011.01)
*G06F 3/01* (2006.01)

(56) References Cited

U.S. PATENT DOCUMENTS

| | | | |
|---|---|---|---|
| 11,307,733 | B2 | 4/2022 | Luo et al. |
| 2014/0137010 | A1 | 5/2014 | Matas et al. |
| 2015/0062130 | A1 | 3/2015 | Ho |
| 2019/0050045 | A1 | 2/2019 | Jha et al. |
| 2019/0286222 | A1 | 9/2019 | An et al. |
| 2021/0082330 | A1 | 3/2021 | Bae et al. |
| 2021/0083498 | A1 | 3/2021 | Cho et al. |
| 2021/0382542 | A1* | 12/2021 | Liu .................. G06V 40/172 |
| 2023/0350535 | A1* | 11/2023 | Zhang ................ G06F 1/3228 |

FOREIGN PATENT DOCUMENTS

| | | |
|---|---|---|
| CN | 113238826 A | 8/2021 |
| CN | 113721826 A | 11/2021 |
| CN | 113766060 A | 12/2021 |
| EP | 3780569 A1 | 2/2021 |
| RU | 2535582 C2 | 12/2014 |
| RU | 2693912 C1 | 7/2019 |

\* cited by examiner

First screen-off animation

Time

Second screen-off animation

Time

Third screen-off animation

Time

Fourth screen-off animation

Time

ALWAYS ON DISPLAY METHOD AND ELECTRONIC DEVICE

CROSS-REFERENCE TO RELATED APPLICATIONS

This application is a continuation of International Application No. PCT/CN2022/073285, filed on Jan. 21, 2022, which claims priority to Chinese Patent Application No. 202110326190.6, filed on Mar. 26, 2021. The disclosures of the aforementioned applications are hereby incorporated by reference in their entireties.

TECHNICAL FIELD

This application relates to the field of terminal technologies, and in particular, to an always on display method and an electronic device.

BACKGROUND

An always on display (AOD) is a function that has an electronic device display time, incoming call information, push messages, and other information in a limited part of the screen without keeping the full screen on.

An example is used that the electronic device is a mobile phone. With always on display enabled, the mobile phone can display time, date, and other information in an area 101 of the screen after the mobile phone becomes screen off, as shown in FIG. 1. In this way, a user is still able to obtain information such as time and date when the mobile phone is screen off.

In some scenarios, when the mobile phone is screen off, the mobile phone can still display a preset screen-off animation in an area 102 of the screen, as shown in FIG. 1. For example, the screen-off animation may be a video with a duration of 3s. After the display of the screen-off animation is over, the mobile phone may keep the last frame of image of the screen-off animation displayed. Such always on display method, although improving the user's visual experience to some extent, features monotonous display mode, which makes always on display content not real-time and not interesting.

SUMMARY

This application provides an always on display method and an electronic device, to perform always on display according to a usage status of the electronic device, so that the usage status of the electronic device is more vividly and effectively conveyed to a user in a screen-off state, making always on display content more real-time and interesting.

To achieve the foregoing objective, this application uses the following technical solutions:

According to a first aspect, this application provides an always on display method, including: receiving, by an electronic device, a screen-off event; in response to the screen-off event, entering, by the electronic device, a screen-off state; and displaying, by the electronic device, a first target screen-off animation in a first display area, where the first target screen-off animation is associated with usage data of the electronic device, and the usage data is used to indicate a usage status of the electronic device.

In this way, by displaying the screen-off animation associated with the usage data of the electronic device, the electronic device in the screen-off state is still able to convey a latest usage status of the electronic device to a user. This not only increases the interest of interaction between the electronic device and the user, but also effectively presents the latest usage status (such as a power level and whether the electronic device is playing music) of the electronic device to the user in a visual and vivid way, making always on display content more real-time and interesting and improving user experience.

In a possible implementation, after the receiving, by an electronic device, a screen-off event, the method further includes: in response to the screen-off event, obtaining, by the electronic device, current usage data. Exemplarily, the foregoing usage data may include one or more of a charge state of the electronic device, power information, a user step count, weather, temperature, or an application running on the electronic device.

In a possible implementation, using the foregoing usage data including the charge state of the electronic device and the power information as an example, power levels of the electronic device may include a first level and a second level, and power of the first level is lower than power of the second level; when the charge state of the electronic device is an in-charging state, the first target screen-off animation is a first screen-off animation, where the first screen-off animation is used to indicate that the electronic device is being charged; and when the charge state of the electronic device is a not-in-charging state, if the current power information is at the first level, the first target screen-off animation is a second screen-off animation, and if the current power information is at the second level, the first target screen-off animation is a third screen-off animation (the second screen-off animation is different from the third screen-off animation).

In other words, when entering the screen-off state, the electronic device may display, according to a current charge state and power information, a corresponding screen-off animation after becoming screen off, to convey a current power status of the electronic device to the user through the corresponding screen-off animation. In this way, when the electronic device is in the screen-off state, the user can visually and effectively learn the current power status of the electronic device from content of the screen-off animation, making always on display content more real-time and interesting.

In a possible implementation, an animation object (such as a person or an animal) in the second screen-off animation may be the same as an animation object in the third screen-off animation; and a moving speed of the animation object in the second screen-off animation is lower than a moving speed of the animation object in the third screen-off animation, or a moving range of the animation object in the second screen-off animation is smaller than a moving range of the animation object in the third screen-off animation. In this way, an animation object with a greater moving range or moving speed can convey to the user information that current power is higher.

In a possible implementation, the power levels of the electronic device may further include a third level, and power of the third level is higher than the power of the second level. In this case, when the charge state of the electronic device is a not-in-charging state, if latest power information is at the third level, the first target screen-off animation is a fourth screen-off animation, and an animation object in the fourth screen-off animation is the same as the animation object in the third screen-off animation, where a moving speed of the animation object in the fourth screen-off animation is higher than the moving speed of the animation object in the third screen-off animation, or a moving range of the animation object in the fourth screen-off animation is larger than the moving range of the animation object in the third screen-off animation.

In a possible implementation, after the displaying, by the electronic device, a first target screen-off animation in a first display area, the method further includes: after playing of the first target screen-off animation is over, displaying, by the electronic device, the last frame of image of the first target screen-off animation in the first display area. Alternatively, after playing of the first target screen-off animation is over, the electronic device displays the first frame of image of the first target screen-off animation in the first display area.

In a possible implementation, after the displaying, by the electronic device, the last frame of image of the first target screen-off animation in the first display area, the method further includes: when the charge state of the electronic device has changed or the power level of the electronic device has changed, playing, by the electronic device, a corresponding second target screen-off animation. In other words, the electronic device can still obtain the latest charge state and power information in real time after entering the screen-off state. When the charge state or power level has changed, the electronic device can convey the latest power status to the user by playing the second target screen-off animation.

In a possible implementation, after the displaying, by the electronic device, the last frame of image of the first target screen-off animation in the first display area, the method further includes: receiving, by the electronic device, a touch operation input by the user; in response to the touch operation, obtaining, by the electronic device, a latest charge state and power information of the electronic device; and when the charge state of the electronic device has changed or the power level of the electronic device has changed, playing, by the electronic device, a corresponding second target screen-off animation; or when the charge state of the electronic device remains unchanged and the power level of the electronic device remains unchanged, playing, by the electronic device, the first target screen-off animation again. In other words, after entering the screen-off state, the electronic device can play screen-off animations in response to touch operations of the user. Before playing the screen-off animation, the electronic device can first obtain the latest charge state and power information and then play the corresponding screen-off animation.

In a possible implementation, the displaying, by the electronic device, a first target screen-off animation in a first display area includes: if the electronic device receives no touch operation input by the user within a preset time, entering, by the electronic device, a screen sleep state, thereby reducing power consumption of the electronic device.

In a possible implementation, after the entering, by the electronic device, a screen sleep state, the method further includes: if the electronic device receives a touch operation input by the user within the preset time, obtaining, by the electronic device, the latest charge state and power information of the electronic device; and when the charge state of the electronic device has changed or the power level of the electronic device has changed, playing, by the electronic device, a corresponding second target screen-off animation; or when the charge state of the electronic device remains unchanged and the power level of the electronic device remains unchanged, playing, by the electronic device, the first target screen-off animation. In other words, after the electronic device enters the screen sleep state, the user can invoke the screen-off animation using a touch operation. Before playing the screen-off animation, the electronic device can first obtain the latest charge state and power information and then play the corresponding screen-off animation.

In a possible implementation, when the first frame of image of the second target screen-off animation is different from the last frame of image of the first target screen-off animation, before the playing, by the electronic device, a corresponding second target screen-off animation, the method further includes: playing, by the electronic device, a transitional screen-off animation, where the first frame of image of the transitional screen-off animation is the same as the last frame of image of the first target screen-off animation, and the last frame of image of the transitional screen-off animation is the same as the first frame of image of the second target screen-off animation. In this way, when switching from one screen-off animation to another screen-off animation in the screen-off state, the electronic device can play a transitional screen-off animation for soft transition, to prevent abrupt appearance of a new screen-off animation, and therefore improve the user's visual experience.

In a possible implementation, after the displaying, by the electronic device, the last frame of image of the first target screen-off animation in the first display area, the method further includes: when the electronic device acquires a facial image or an eye image of the user, playing, by the electronic device, a corresponding interactive screen-off animation, where an animation object in the interactive screen-off animation presents a state of interacting with the user, thereby enhancing interaction and interest between the user and the electronic device.

In a possible implementation, after the entering, by the electronic device, a screen-off state, the method further includes: displaying, by the electronic device, one or more of time, date, power, or notification in a second display area.

Exemplarily, the first frame of image and the last frame of image of the first target screen-off animation may be the same to make seamless transition when the electronic device displays the first target screen-off animation a plurality of times.

According to a second aspect, this application provides an electronic device, including: a touchscreen, where the touchscreen includes a touch sensor and a display; one or more processors; and a memory. The memory stores one or more computer programs including instructions. When the instructions are executed by the electronic device, the electronic device is enabled to perform the following steps: receiving a screen-off event; in response to the screen-off event, entering a screen-off state; and displaying a first target screen-off animation in a first display area, where the first target screen-off animation is associated with usage data of the electronic device, and the usage data is used to indicate a usage status of the electronic device.

In a possible implementation, after the electronic device receives the screen-off event, the electronic device is further configured to: in response to the screen-off event, obtain the usage data.

In a possible implementation, the usage data includes a charge state and power information of the electronic device, where power levels of the electronic device include a first level and a second level, and power of the first level is lower than power of the second level; when the charge state of the electronic device is an in-charging state, the first target screen-off animation is a first screen-off animation, where the first screen-off animation is used to indicate that the electronic device is being charged; and when the charge state of the electronic device is a not-in-charging state, if the power information is at the first level, the first target screen-off animation is a second screen-off animation, and if the power information is at the second level, the first target screen-off animation is a third screen-off animation, where the second screen-off animation is different from the third screen-off animation.

In a possible implementation, an animation object in the second screen-off animation is the same as an animation object in the third screen-off animation; and a moving speed of the animation object in the second screen-off animation is lower than a moving speed of the animation object in the third screen-off animation, or a moving range of the animation object in the second screen-off animation is smaller than a moving range of the animation object in the third screen-off animation.

In a possible implementation, the power levels of the electronic device further include a third level, and power of the third level is higher than the power of the second level. When the charge state of the electronic device is a not-in-charging state, if the power information is at the third level, the first target screen-off animation is a fourth screen-off animation, and an animation object in the fourth screen-off animation is the same as the animation object in the third screen-off animation, where a moving speed of the animation object in the fourth screen-off animation is higher than the moving speed of the animation object in the third screen-off animation, or a moving range of the animation object in the fourth screen-off animation is larger than the moving range of the animation object in the third screen-off animation.

In a possible implementation, after the electronic device displays the first target screen-off animation in the first display area, the electronic device is further configured to: after playing of the first target screen-off animation is over, display the last frame of image of the first target screen-off animation in the first display area.

In a possible implementation, after the electronic device displays the last frame of image of the first target screen-off animation in the first display area, the electronic device is further configured to: when the charge state of the electronic device has changed or the power level of the electronic device has changed, play a corresponding second target screen-off animation.

In a possible implementation, after the electronic device displays the last frame of image of the first target screen-off animation in the first display area, the electronic device is further configured to: receive a touch operation input by the user; in response to the touch operation, obtain a charge state and power information of the electronic device; and when the charge state of the electronic device has changed or the power level of the electronic device has changed, play a corresponding second target screen-off animation; or when the charge state of the electronic device remains unchanged and the power level of the electronic device remains unchanged, play the first target screen-off animation.

In a possible implementation, that the electronic device displays the first target screen-off animation in the first display area specifically includes: if the electronic device receives no touch operation input by the user within a preset time, the electronic device enters a screen sleep state.

In a possible implementation, after the electronic device enters the screen sleep state, the electronic device is further configured to: if the electronic device receives a touch operation input by the user within the preset time, determine whether the charge state or the power level of the electronic device has changed or not; and when the charge state of the electronic device has changed or the power level of the electronic device has changed, play a corresponding second target screen-off animation; or when the charge state of the electronic device remains unchanged and the power level of the electronic device remains unchanged, play the first target screen-off animation.

In a possible implementation, the first frame of image of the second target screen-off animation is different from the last frame of image of the first target screen-off animation; and before the electronic device plays a corresponding second target screen-off animation, the electronic device is further configured to: play a transitional screen-off animation, where the first frame of image of the transitional screen-off animation is the same as the last frame of image of the first target screen-off animation, and the last frame of image of the transitional screen-off animation is the same as the first frame of image of the second target screen-off animation.

In a possible implementation, after the electronic device displays the last frame of image of the first target screen-off animation in the first display area, the electronic device is further configured to: when the electronic device acquires a facial image or an eye image of the user, play a corresponding interactive screen-off animation, where an animation object in the interactive screen-off animation presents a state of interacting with the user.

In a possible implementation, after the electronic device enters a screen-off state, the electronic device is further configured to: display one or more of time, date, power, or notification in a second display area.

In a possible implementation, the first frame of image and the last frame of image of the first target screen-off animation are the same.

In a possible implementation, the foregoing usage data may include one or more of a user step count, weather, temperature, or an application running on the electronic device.

According to a third aspect, this application provides an electronic device, including: a memory, a display, and one or more processors, where the memory, the display, and the processor are coupled to each other. The memory is configured to store computer program code including computer instructions. When the electronic device is running, the processor is configured to execute the one or more computer instructions stored in the memory, to enable the electronic device to perform the always on display method according to any one of the implementations of the first aspect.

According to a fourth aspect, this application provides a computer storage medium including computer instructions, where when the computer instructions are executed on an electronic device, the electronic device is enabled to perform the always on display method according to any one of the implementations of the first aspect.

According to a fifth aspect, this application provides a computer program product, where when the computer program product is run on an electronic device, the electronic device is enabled to perform the always on display method according to any one of the implementations of the first aspect.

It can be understood that the electronic devices described in the second aspect and the third aspect, the computer storage medium described in the fourth aspect, and the computer program product described in the fifth aspect are all used to perform the corresponding method provided above. Therefore, for beneficial effects that they can achieve, reference may be made to the beneficial effects of the corresponding method provided above. Details are not described herein again.

DETAILED DESCRIPTION OF THE EMBODIMENTS

The terms such as "first" and "second" in the following are used only for descriptive purposes, and should not be construed as indicating or implying relative importance or implying the number of indicated technical features. Therefore, features modified by "first" and "second" may explicitly or implicitly include one or more of such features. In descriptions of the embodiments, unless otherwise specified, "plurality" means at least two.

Implementations of the embodiments are described below with reference to the accompanying drawings.

Exemplarily, an always on display method provided in the embodiments of this application can be applied to a mobile phone, a vehicle-mounted device (also referred to as an in-vehicle device), a tablet computer, a notebook computer, an ultra-mobile personal computer (UMPC), a handheld computer, a netbook, a personal digital assistant (PDA), a wearable electronic device, a virtual reality device, or another electronic device with an always on display function, which are not limited in the embodiments of this application.

Figure 1:
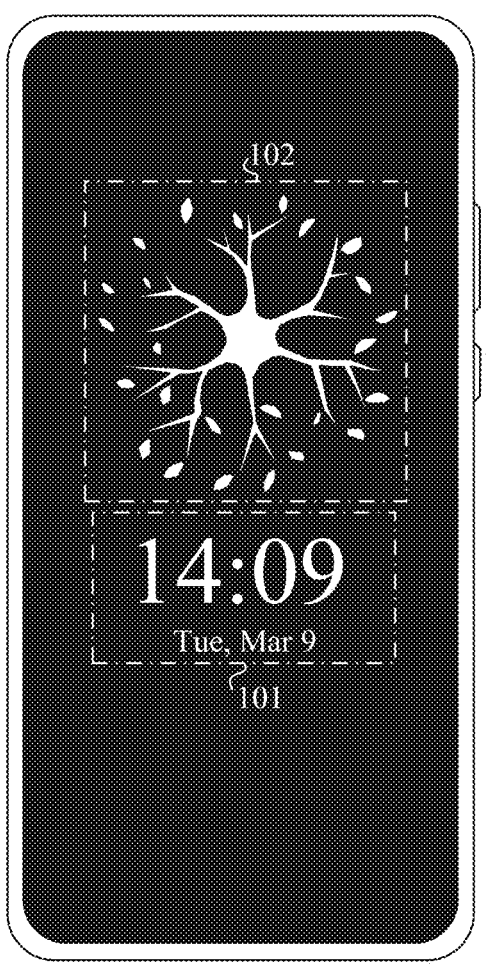
FIG. 1 is a schematic diagram of an application scenario of an always on display function in the prior art.
Figure 2:
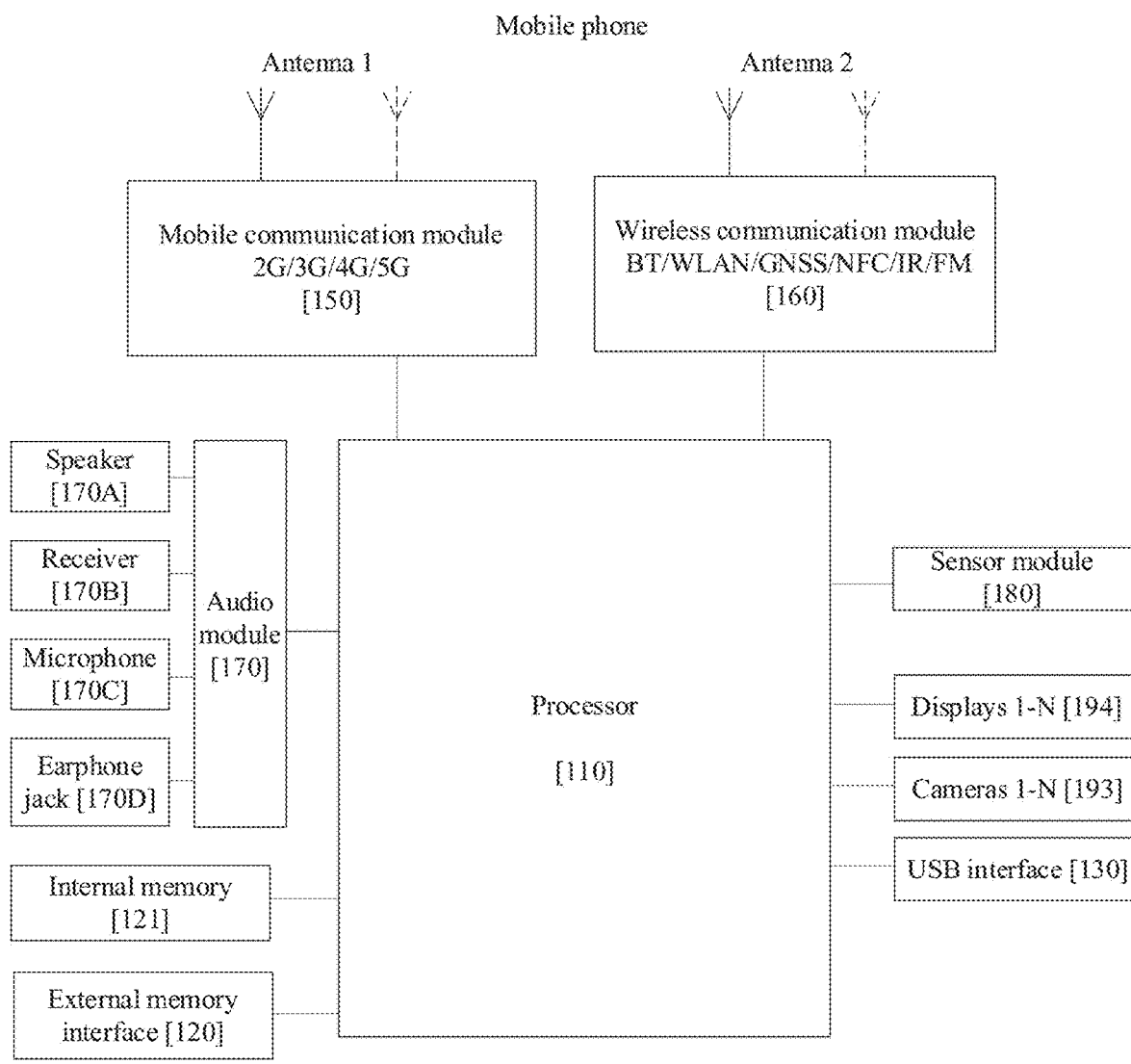
FIG. 2 is a first schematic structural diagram of an electronic device according to an embodiment of this application.

For example, the foregoing electronic device is a mobile phone. FIG. 2 is a schematic structural diagram of a mobile phone.

The mobile phone may include a processor 110, an external memory interface 120, an internal memory 121, a universal serial bus (USB) interface 130, an antenna 1, an antenna 2, a mobile communication module 150, a wireless communication module 160, an audio module 170, a speaker 170A, a receiver 170B, a microphone 170C, an earphone jack 170D, a sensor module 180, and the like.

It can be understood that structures illustrated in the embodiments of this application do not constitute specific limitations on the mobile phone. In other embodiments of this application, a mobile phone may include more or fewer components than shown in the drawings; or have some components combined or split, or have different arrangements of components. The illustrated components may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be separate components, or may be integrated into one or more processors.

The processor 110 may further be provided with a memory for storing instructions and data. In some embodiments, the memory in the processor 110 is a cache memory.

The memory may store instructions or data that have just been used or used repeatedly by the processor 110. If the processor 110 needs to use the instructions or data again, the processor may directly invoke the instructions or data from the memory. This avoids repeated access and reduces a waiting time of the processor 110, thereby improving efficiency of a system.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

A wireless communication function of the mobile phone can be implemented by the antenna 1, the antenna 2, the mobile communication module 150, the wireless communication module 160, the modem processor, the baseband processor, and the like.

The antenna 1 and the antenna 2 are used to transmit and receive electromagnetic wave signals. Each antenna in the mobile phone can be used to cover one or more communication bands. Different antennas may be reused to improve antenna utilization. For example, the antenna 1 may be reused as a diversity antenna of a wireless local area network. In other embodiments, the antenna may be used in combination with a tuning switch.

The mobile communication module 150 can provide solutions for wireless communications such as 2G, 3G, 4G, and 5G which are applied on the mobile phone. The mobile communication module 150 may include at least one filter, a switch, a power amplifier, a low noise amplifier (LNA), and the like. The mobile communication module 150 can receive an electromagnetic wave via the antenna 1, perform filtering, amplifying, and other processing on the received electromagnetic wave, and transmit the processed electromagnetic wave to the modem processor for demodulation. The mobile communication module 150 can also amplify a signal modulated by the modem processor, which is transmitted out by the antenna 1 through radiation as an electromagnetic wave. In some embodiments, at least some of the functional modules of the mobile communication module 150 can be provided in the processor 110. In some embodiments, at least some of the functional modules of the mobile communication module 150 may be provided in the same device as at least some of the modules of the processor 110.

The wireless communication module 160 can provide solutions for wireless communications which are applied on the mobile phone, including wireless local area network (WLAN) (for example, wireless fidelity (Wi-Fi) network), bluetooth (BT), global navigation satellite system (GNSS), frequency modulation (FM), near field communication (NFC), or infrared (IR). The wireless communication module 160 may be one or more devices integrating at least one communications processor module. The wireless communication module 160 receives an electromagnetic wave via the antenna 2, performs frequency modulation and filtering on the electromagnetic wave signal, and sends the processed signal to the processor 110. The wireless communication module 160 may further receive a to-be-sent signal from the processor 110, and perform frequency modulation and amplification on the signal, which is transmitted out by the antenna 2 through radiation as an electromagnetic wave.

In some embodiments, the antenna 1 of the mobile phone is coupled to the mobile communication module 150, and the antenna 2 is coupled to the wireless communication module 160, so that the mobile phone can communicate with a network and another device through a wireless communication technology. The wireless communication technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, IR, and/or the like. The GNSS may include the global positioning system (GPS), the global navigation satellite system (GLONASS), the Beidou navigation satellite system (BDS), the quasi-zenith satellite system (QZSS) and/or satellite based augmentation systems (SBAS).

The mobile phone realizes a display function through the GPU, a display 194, and the application processor. The GPU is a microprocessor for image processing which is connected to the display 194 and the application processor. The GPU is configured to perform mathematical and geometric computation for graphics rendering. The processor 110 may include one or more GPUs that execute program instructions to generate or change display information.

The display 194 is configured to display images, videos, or the like. The display 194 includes a display panel. The display panel may use a liquid crystal display (LCD), organic light-emitting diodes (OLEDs), active-matrix organic light emitting diodes (AMOLEDs), flexible light-emitting diodes (FLEDs), Miniled, MicroLed, Micro-oLed, quantum dot light emitting diodes (QLEDs), or the like. In some embodiments, the mobile phone may include 1 or N displays 194, where N is a positive integer greater than 1.

Using an OLED display as an example, one OLED display may include a plurality of OLED pixel units arranged in an array. As shown in FIG. 2, each OLED pixel unit includes a cathode 201, an anode 202, and an electron transport layer 203, a hole transport layer 204 and a light-emitting layer 205 that are located between the cathode 201 and the anode 202. The cathode 201 may be a metal electrode, and the anode 202 may be an indium tin oxide (ITO) transparent electrode.

After a driving voltage V is input to the cathode 201 and the anode 202, under the action of the driving voltage V, electrons are transferred from the cathode 201 to the electron transport layer 203, and holes are injected from the anode 202 to the hole transport layer 204. The electrons and holes meet in the light-emitting layer 205 to produce excitons, which excite light-emitting molecules in the light-emitting layer 205 to generate a light source after radiation. Different driving voltages V can excite corresponding OLED pixel units to present different colors and luminance. In this way, the OLED pixel units in the OLED display can display pictures corresponding to different driving voltages.

Organic materials in the electron transport layer 203, the hole transport layer 204, and the light-emitting layer 205 will gradually age with use. The phenomenon of ghost image on an OLED display is actually the result of faster depletion of active materials from OLED pixel units at a specific position than other positions because the pixel units at that position are always displaying a same stationary image over a long time, where such faster depletion causes faster attenuation of emitting efficiency.

The mobile phone can implement a shooting function through the ISP, a camera 193, the video codec, the GPU, the display 194, the application processor, and the like.

The ISP is configured to process data fed back by the camera 193. For example, when a shutter is opened for taking a photo, light is transmitted to an image sensor of the camera through lenses so that an optical signal is converted into an electrical signal. The image sensor of the camera transmits the electrical signal to the ISP for processing, so that the electrical signal is converted into an image visible to eyes. The ISP may further optimize noise, luminance, and skin tone of the image by applying an algorithm. The ISP may further optimize exposure, color temperature, and other parameters of a shooting scene. In some embodiments, the ISP may be provided in the camera 193.

The camera 193 is configured to capture stationary images or videos. The lens captures an object and generates an optical image, which is projected to the image sensor. The image sensor may be a charge coupled device (CCD) or a complementary metal-oxide-semiconductor (CMOS) phototransistor. The image sensor converts an optical signal into an electrical signal, and then transmits the electrical signal to the ISP which converts the electrical signal into a digital image signal. The ISP outputs the digital image signal to the DSP for processing. The DSP converts the digital image signal into an image signal in a standard format such as RGB or YUV. In some embodiments, the mobile phone may include 1 or N cameras 193, where N is a positive integer greater than 1.

The digital signal processor is configured to process digital signals, including digital image signals and other digital signals. For example, when the mobile phone selects a frequency, the digital signal processor is configured to perform Fourier transform on energy at that frequency.

The video codec is configured to compress or decompress a digital video. The mobile phone can support one or more video codecs. In this way, the mobile phone can play or record videos in various coding formats such as moving picture experts group (MPEG) 1, MPEG2, MPEG3, and MPEG4.

The external memory interface 120 can be configured to connect an external memory card, for example, a Micro SD card, to expand a storage capacity of the mobile phone. The external memory card communicates with the processor 110 via the external memory interface 120 to implement a data storage function. For example, files such as music and videos are stored in the external memory card.

The internal memory 121 may be configured to store computer-executable program code which includes instructions. The processor 110 executes various functional applications and data processing of the mobile phone by running the instructions stored in the internal memory 121. The internal memory 121 may include a program storage area and a data storage area. The program storage area may store an operating system, an application program required by at least one function (such as a sound playing function or an image playing function), and the like. The data storage area can store data (such as audio data or a phone book) created with use of the mobile phone. In addition, the internal memory 121 may include a high-speed random access memory, and may also include a non-volatile memory, for example, at least one magnetic disk storage device, flash memory device, or universal flash storage (UFS).

With the audio module 170, the speaker 170A, the receiver 170B, the microphone 170C, the earphone jack 170D, and the application processor, the mobile phone can implement audio functions, for example, music play and recording.

The audio module 170 is configured to convert digital audio information into an analog audio signal for output, and also configured to convert an analog audio input into a digital audio signal. The audio module 170 may further be configured to encode and decode audio signals. In some embodiments, the audio module 170 may be provided in the processor 110, or some functional modules of the audio module 170 may be provided in the processor 110.

The speaker 170A, also referred to as a "loudspeaker", is configured to convert an audio electrical signal into a sound signal. The mobile phone can use the speaker 170A to play music or receive call handsfree.

The receiver 170B, also referred to as a "phone receiver", is configured to convert an audio electrical signal into a sound signal. When the mobile phone receives a call or a voice message, the receiver 170B can be placed close to a human ear for the voice to be heard.

The microphone 170C, also referred to as a "mic" or "mike", is configured to convert a sound signal into an electrical signal. When making a call or sending a voice message, a user can make a sound with the microphone 170C close to his/her mouth so as to input a sound signal into the microphone 170C. The mobile phone may be provided with at least one microphone 170C. In other embodiments, the mobile phone may be provided with two microphones 170C, which, in addition to collecting sound signals, can also implement a noise reduction function. In other embodiments, the mobile phone may alternatively be provided with three, four or more microphones 170C to, for example, collect sound signals, reduce noise, identify sound sources, and implement a directional recording function.

The earphone jack 170D is configured to connect a wired earphone. The earphone jack 170D may be a USB interface 130, a 3.5 mm open mobile terminal platform (OMTP) standard interface, or a USA cellular telecommunications industry association (CTIA) standard interface.

The sensor module 180 may include a pressure sensor, a gyroscope sensor, an atmospheric pressure sensor, a magnetic sensor, an acceleration sensor, a distance sensor, an optical proximity sensor, a fingerprint sensor, a temperature sensor, a touch sensor, an ambient light sensor, a bone conduction sensor, or the like.

Certainly, the mobile phone may further include a charge management module, a power management module, a battery, a button, an indicator, one or more SIM card interfaces, and the like, which are not limited in the embodiments of this application.

Figure 3:
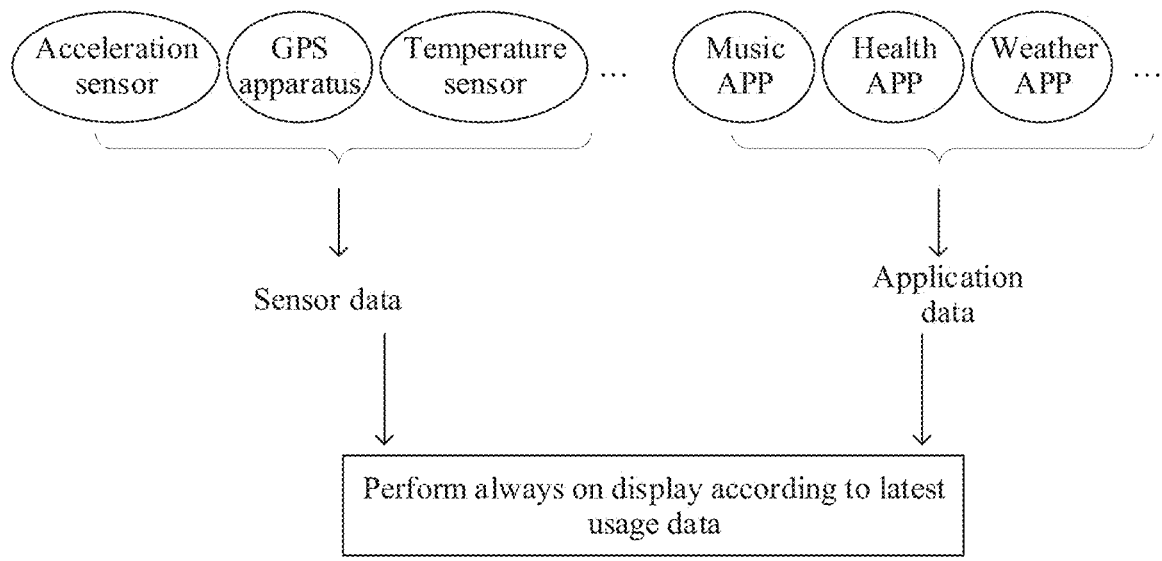
FIG. 3 is a first schematic flowchart of an always on display method according to an embodiment of this application.

Still using example that the foregoing electronic device is a mobile phone, as shown in FIG. 3, the mobile phone may use the sensors in the above sensor module to collect corresponding sensor data. For example, the mobile phone may use a GPS apparatus to obtain a location of the user. For another example, the mobile phone may use the acceleration sensor and a gravity sensor to obtain a user step count. For another example, the mobile phone may use the temperature sensor to obtain a temperature of an environment in which the user is located.

Still as shown in FIG. 3, applications (APPs) such as weather, calendar, music or health can also be installed on the mobile phone. The mobile phone may also obtain corresponding application data from these applications. For example, the mobile phone can obtain power information of the mobile phone through a battery function in a settings APP. For another example, the mobile phone can learn whether the mobile phone is playing music through the music APP. For another example, the mobile phone can obtain health data such as the step count and heart rate of the user through the health APP.

In the embodiments of this application, the foregoing sensor data and/or application data may be referred to as usage data of the mobile phone, and the usage data may be used to reflect a usage status of the mobile phone. Still as shown in FIG. 3, when the mobile phone is screen off (also referred to as being screen-off, screen-off, screen locked, or screen asleep), the mobile phone can perform always on display according to its latest usage data, so that always on display content displayed by the mobile phone in a screen-off state is associated with a latest usage status of the mobile phone.

For example, when the latest usage data of the mobile phone indicates that the mobile phone is playing music, the mobile phone can display a screen-off animation of a dancing bear after the screen becomes off. For another example, when the latest usage data of the mobile phone indicates that the user step count is greater than a preset value, the mobile phone can display a screen-off animation of an exercising bear after the screen becomes off. For another example, when the latest usage data of the mobile phone indicates that power of the mobile phone is less than a preset value, the mobile phone can display a screen-off animation of a bear lying down after the screen becomes off. In this way, by displaying a screen-off animation associated with the usage data of the mobile phone, the mobile phone in the screen-off state is still able to convey a latest usage status of the mobile phone to the user. This not only increases the interest of interaction between the mobile phone and the user, but also effectively presents the latest usage status (such as a power level and whether the mobile phone is playing music) of the mobile phone to the user in a visual and vivid way, thereby improving user experience.

Certainly, the mobile phone in the screen-off state may alternatively convey the usage status of the mobile phone to the user in other manners such as displaying text or a picture associated with the usage data of the mobile phone. This is not limited in the embodiments of this application.

The always on display method provided by the embodiments of this application is specifically described below with reference to the accompanying drawings. The following embodiments are all described by using as an example that the electronic device with an always on display function is a mobile phone.

Figure 4:
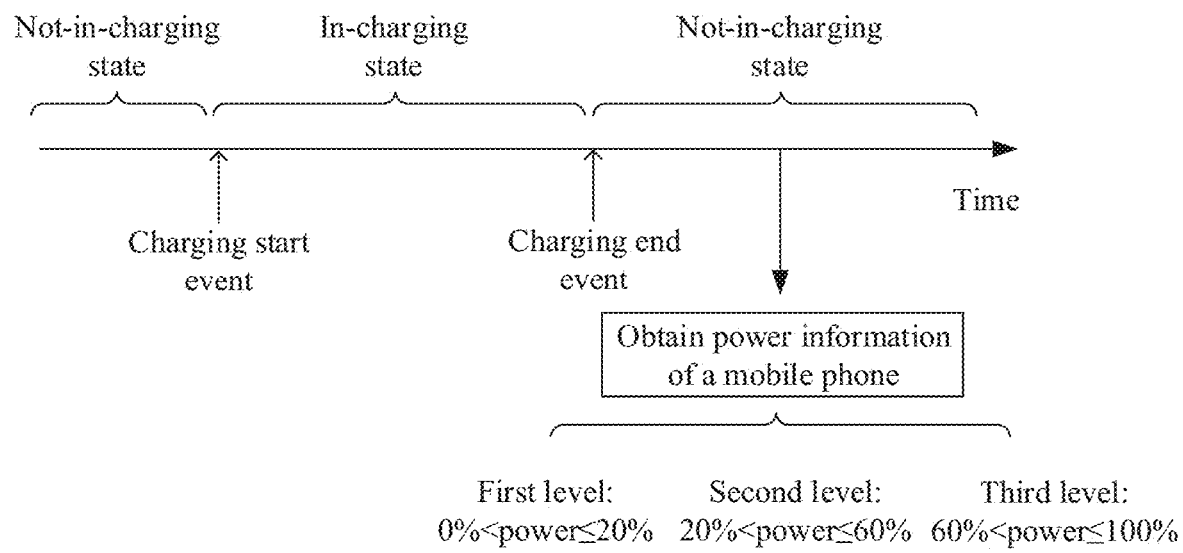
FIG. 4 is a second schematic flowchart of an always on display method according to an embodiment of this application.

For example, the mobile phone may be provided with a power management unit which is capable of monitoring a charge state of the mobile phone in real time. For example, the power management unit may be a power manager service (PMS) in the mobile phone. When the mobile phone is connected to a USB or wireless charging apparatus, a charging start event may be reported to the PMS. Correspondingly, when the mobile phone is disconnected from the USB or wireless charging apparatus, a charging end event may be reported to the PMS. Then, as shown in FIG. 4, when acquiring a charging start event and no charging end event, the PMS can determine that the mobile phone is in an in-charging state. Otherwise, the PMS can determine that the mobile phone is in a not-in-charging state.

In some embodiments, the foregoing power management unit (for example, PMS) may further monitor power information of the mobile phone in real time, and then determine a specific level of power of the mobile phone based on the power information of the mobile phone. For example, three levels may be defined in advance for the power of the mobile phone. The first level is 0%<power≤20%, which is a low power state; the second level is 20%<power≤60%, which is a medium power state; and the third level is 60%<power≤100%, which is a high power state. Certainly, persons skilled in the art may alternatively define more or fewer levels for the power of the mobile phone according to actual needs or actual application scenarios. Still as shown in FIG. 3, after determining that the mobile phone is in a not-in-charging state, the power management unit may further determine that current power of the mobile phone is in the first level, the second level, or the third level based on newly obtained power information.

In the embodiments of this application, the mobile phone that is entering a screen-off state can obtain a latest charge state and power information of the mobile phone according to the foregoing method, and display different screen-off animations in the screen-off state according to the latest charge state and power information of the mobile phone. In this way, a current power status of the mobile phone can be vividly conveyed to a user through different screen-off animations, so that the user can visually and vividly learn the power status of the mobile phone when the mobile phone is screen off, and the interest of always on display is enhanced.

Figure 5:
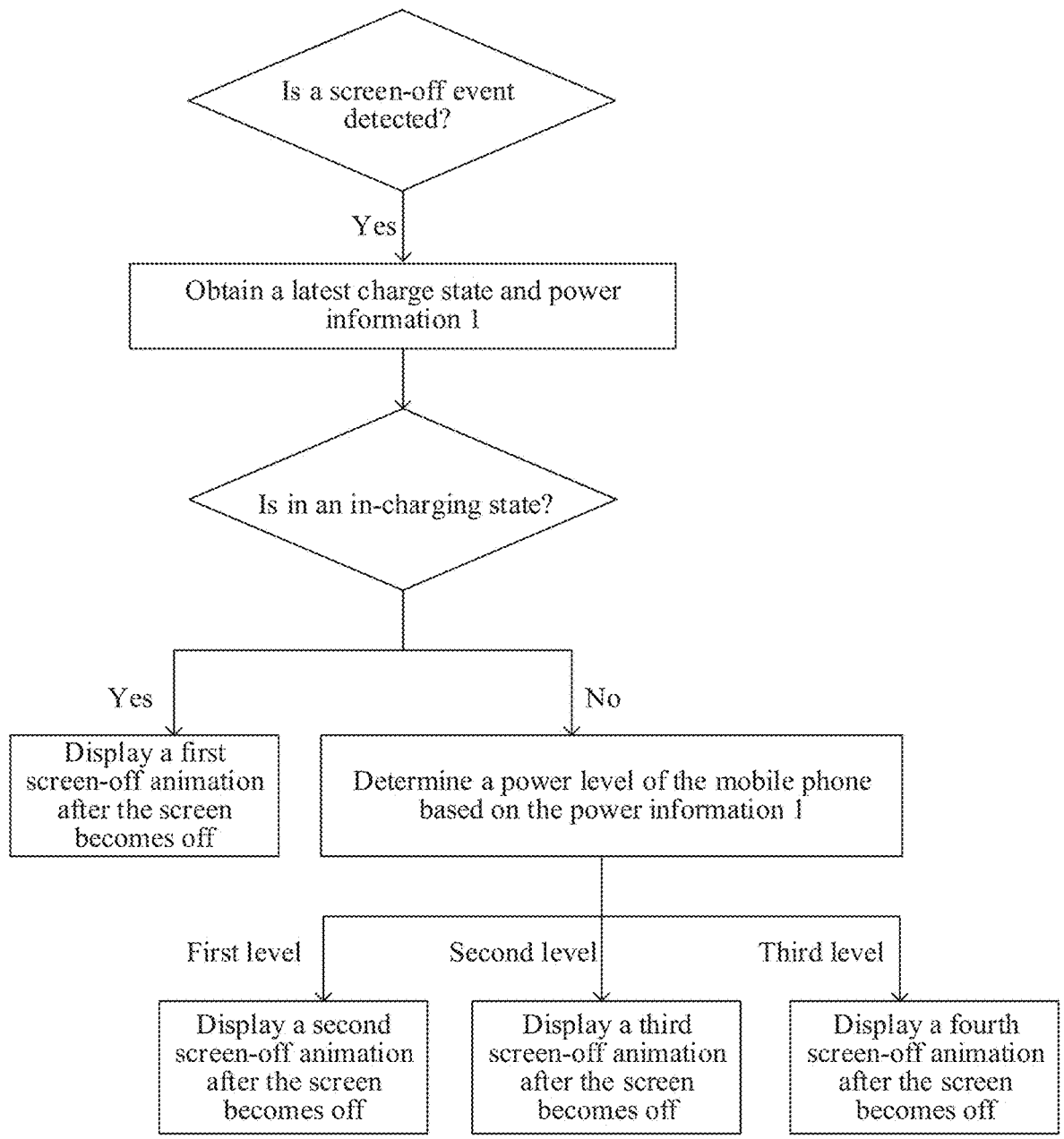
FIG. 5 is a third schematic flowchart of an always on display method according to an embodiment of this application.

For example, as shown in FIG. 5, the mobile phone may receive a screen-off event input by the user, and the screen-off event may be used to trigger the mobile phone to enter a screen-off state. For example, the screen-off event may be an event that the user presses a power button when the mobile phone is screen on. For another example, the screen-off event may be an event that no user operation is detected within a time period when the mobile phone is screen on.

Figure 6:
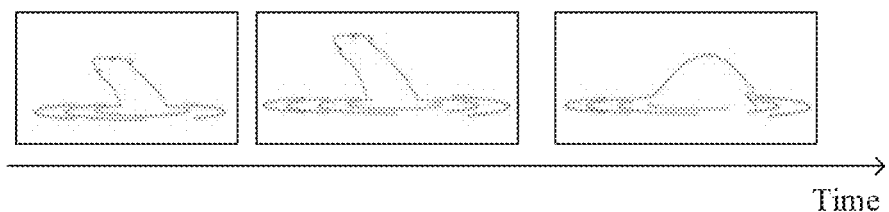
FIG. 6 is a first schematic diagram of an application scenario of an always on display method according to an embodiment of this application.

Still as shown in FIG. 5, if the mobile phone detects a screen-off event, the mobile phone can obtain the latest charge state and power information 1 according to the foregoing method. If the mobile phone is in an in-charging state, no matter how much power the mobile phone is having, the mobile phone may display a first screen-off animation associated with the in-charging state after the screen becomes off. The first screen-off animation may be a video of a given duration. The first screen-off animation can convey the in-charging state of the mobile phone to the user. For example, as shown in FIG. 6, the first screen-off animation may be a polar bear swimming in a lake. Alternatively, the first screen-off animation may be a cat sleeping on the grass. In this way, the in-charging state of the mobile phone can be conveyed to the user through relatively leisurely animations such as swimming and sleeping, so that the user can visually and vividly learn that the mobile phone is currently in the in-charging state.

Figure 7:
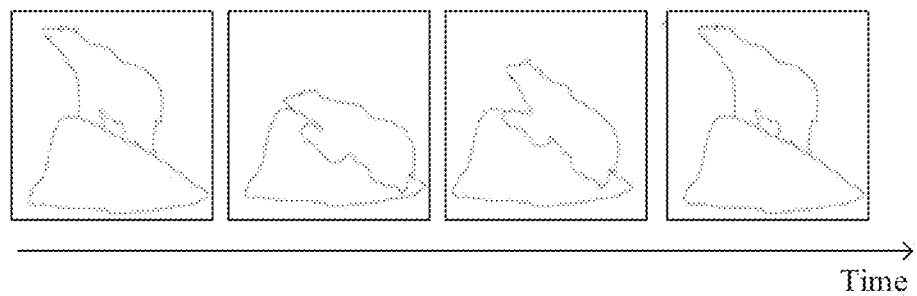
FIG. 7 is a second schematic diagram of an application scenario of an always on display method according to an embodiment of this application.

Still as shown in FIG. 5, if the mobile phone is in a not-in-charging state, the mobile phone may determine a specific level of the power of the mobile phone based on the newly obtained power information 1. For example, if 0%<power information 1≤20%, the mobile phone may determine that the power of the mobile phone is at the first level, that is, a low power state, and the mobile phone can display a second screen-off animation associated with the first level of power information after the screen becomes off. Duration of the second screen-off animation may be the same as or different from duration of the first screen-off animation. The second screen-off animation can convey information to the user that the mobile phone is in a low power state. For example, as shown in FIG. 7, the second screen-off animation may be a polar bear lying on the ice and looking up at the sky. In the second screen-off animation, a moving speed (for example, V1) of the polar bear may be lower, or a moving range (A1) of the polar bear in the second screen-off animation may be smaller, so that the polar bear looks more tired, to visually and vividly convey information to the user that the phone is in a low power state.

Figure 8:
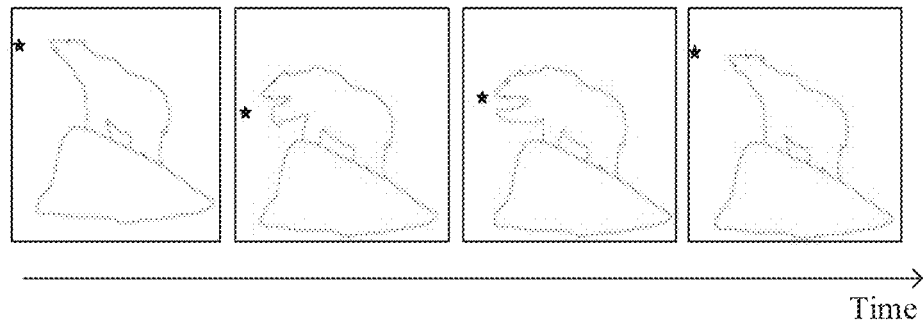
FIG. 8 is a third schematic diagram of an application scenario of an always on display method according to an embodiment of this application.

Still as shown in FIG. 5, if 20%<power information 1≤60%, the mobile phone may determine that the power of the mobile phone is at the second level, that is, a medium power state, and the mobile phone can display a third screen-off animation associated with power information of the second level after the screen becomes off. Similarly, duration of the third screen-off animation may be the same as or different from the duration of the first screen-off animation (or the second screen-off animation). The third screen-off animation can convey information to the user that the mobile phone is in a medium power state. For example, as shown in FIG. 8, the third screen-off animation may be a polar bear on the ice interacting with a shooting star or another object. A moving speed (for example, V2) of the polar bear in the third screen-off animation may be higher than the moving speed of the polar bear in the second screen-off animation, that is, V2>V1. Alternatively, a moving range (for example, A2) of the polar bear in the third screen-off animation may be larger than the moving range of the polar bear in the second screen-off animation, that is, A2>A1. In this way, compared with the second screen-off animation, the polar bear in the third screen-off animation looks more energetic, thereby visually and vividly conveying information to the user that the mobile phone is in a medium power state.

Figure 9:
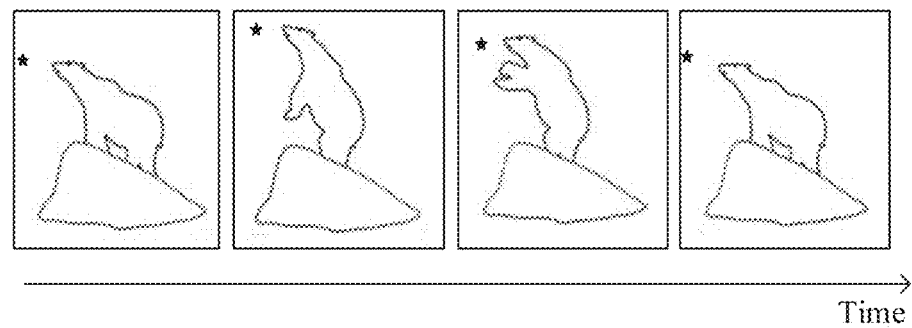
FIG. 9 is a fourth schematic diagram of an application scenario of an always on display method according to an embodiment of this application.

Still as shown in FIG. 5, if 60%<power information 1≤100%, the mobile phone may determine that the power of the mobile phone is at the third level, that is, a high power state, and the mobile phone can display a fourth screen-off animation associated with power information of the third level after the screen becomes off. Similarly, duration of the fourth screen-off animation may be the same as or different from the duration of the first screen-off animation (or the second screen-off animation or the third screen-off animation). The fourth screen-off animation can convey information to the user that the mobile phone is in a high power state. For example, as shown in FIG. 9, the fourth screen-off animation may be a polar bear standing on the ice and interacting with a shooting star or another object. A moving speed (for example, V3) of the polar bear in the fourth screen-off animation may be higher than the moving speed of the polar bear in the third screen-off animation, that is, V3>V2. Alternatively, a moving range (for example, A3) of the polar bear in the fourth screen-off animation may be larger than the moving range of the polar bear in the third screen-off animation, that is, A3>A2. In this way, compared with the third screen-off animation, the polar bear in the third screen-off animation looks even more energetic, thereby visually and vividly conveying information to the user that the mobile phone is in a high power state.

A person or an animal (for example, the polar bear) in the screen-off animations (for example, the first screen-off animation to the fourth screen-off animation) may be referred to as an animation object. In this way, current power information of the mobile phone can be conveyed to the user through an action or state of or an activity being carried out by the animation object in the screen-off animation.

It can be learned that when entering the screen-off state, the mobile phone may display, according to the charge state and power information of the mobile phone, a corresponding screen-off animation after becoming screen off, to convey a current power status of the mobile phone to the user through the corresponding screen-off animation. In this way, when the mobile phone is in the screen-off state, the user can visually and effectively learn the current power status of the mobile phone from content of the screen-off animation, making always on display content more real-time and interesting.

Figure 10:
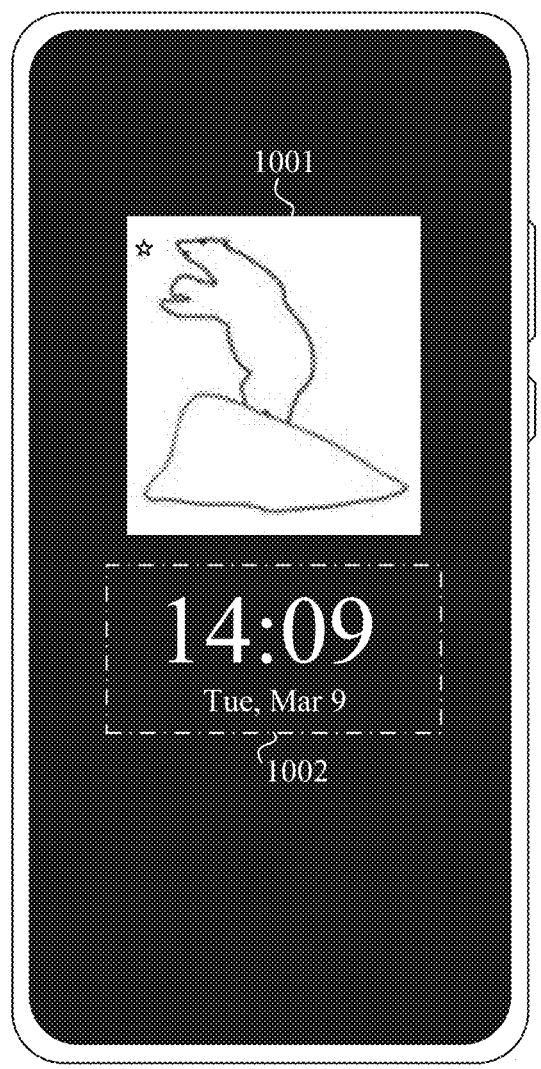
FIG. 10 is a fifth schematic diagram of an application scenario of an always on display method according to an embodiment of this application.

Exemplarily, as shown in FIG. 10, after entering the screen-off state, the mobile phone can display a corresponding screen-off animation (for example, any one of the first screen-off animation to the fourth screen-off animation) in a first area 1001 of the screen. In addition, after entering the screen-off state, the mobile phone may also display the current time, date or an icon of a notification message in a second area 1002. Certainly, the mobile phone can also display a fingerprint recognition area or the like in the screen-off state, which is not limited in the embodiments of this application.

In some embodiments, after the mobile phone finishes displaying the corresponding screen-off animation in the first area 1001 of the screen, the mobile phone may keep the last frame of image of the screen-off animation displayed. In other words, the last frame of image of the screen-off animation displayed is continuously displayed in the first area 1001. Alternatively, after the mobile phone finishes displaying the corresponding screen-off animation in the first area 1001 of the screen, the mobile phone may keep the first frame of image of the screen-off animation displayed. Alternatively, the mobile phone may cyclically display the corresponding screen-off animation in the first area 1001. This is not limited in the embodiments of this application.

Exemplarily, the first frame of image and the last frame of image of each screen-off animation in the first screen-off animation to the fourth screen-off animation may be set to the same. In this way, in cyclic display of one screen-off animation or switching from one screen-off animation to another screen-off animation, seamless transition can be implemented between the screen-off animations, thereby improving a display effect of the screen-off animations.

In some embodiments, the user may set multiple display modes for the always on display function, such as all-day display, timed display, or display upon touch. In the all-day display mode, when the mobile phone enters the screen-off state at any time of a day, the foregoing screen-off animation and like content need to be displayed. In the timed display mode, if the mobile phone enters the screen-off state during a time range set by the user, the foregoing screen-off animation and like content need to be displayed. For example, the user sets always on display to be enabled in the time range of 8:00-18:00. Then, after the mobile phone detects a screen-off event, if a current time is between 8:00-18:00, the foregoing screen-off animation and like content may be displayed after the mobile phone becomes screen off. Otherwise, the mobile phone may enter a screen sleep state. In the display upon touch mode, after the mobile phone enters the screen-off state, the foregoing screen-off animation and like content are displayed in fixed time. If a touch operation of the user is not detected, the mobile phone may stop displaying the foregoing screen-off animation and like content and enter the screen sleep state. Correspondingly, if a touch operation of the user is detected in the screen sleep state, the mobile phone may display the foregoing screen-off animation and like content again. The mobile phone in the screen sleep state generally does not display any content on the display, so that the entire display area of the display appears black.

Figure 11:
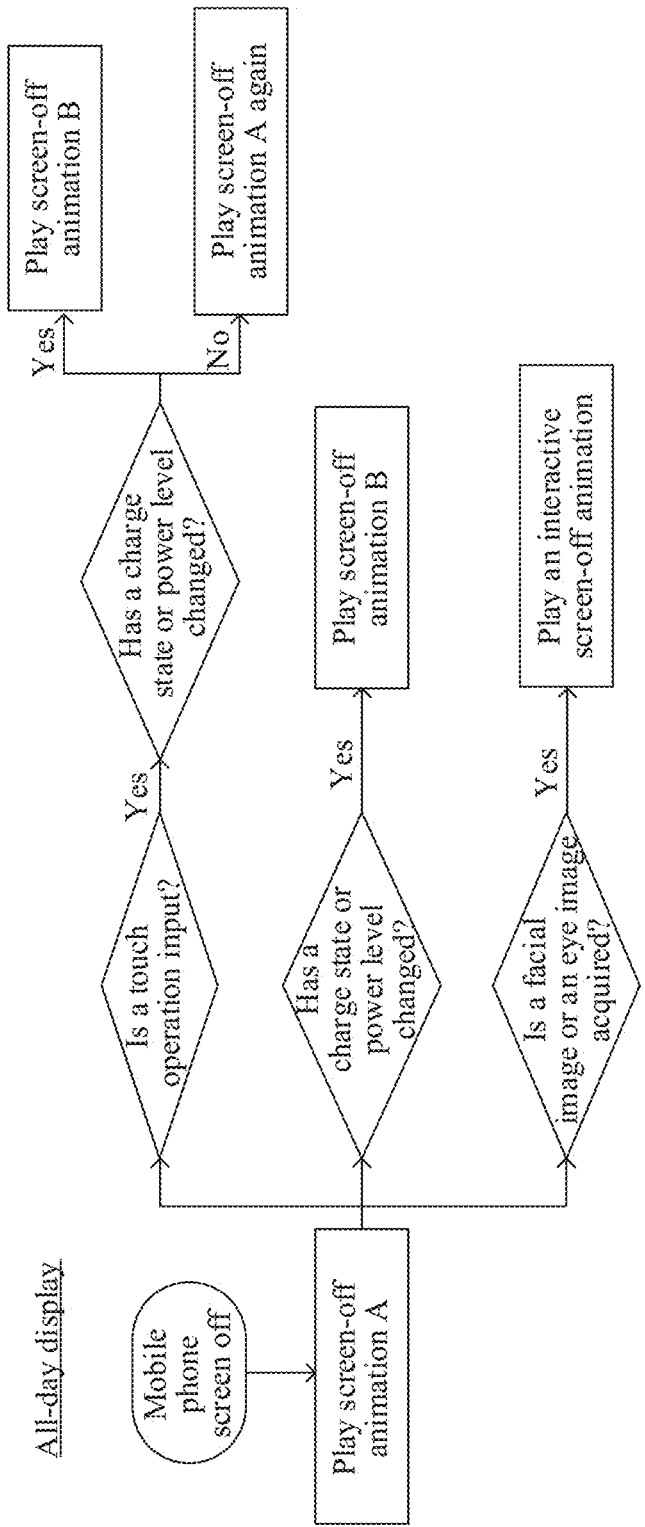
FIG. 11 is a fourth schematic flowchart of an always on display method according to an embodiment of this application.

Exemplarily, when the display mode of the always on display function is all-day display, as shown in FIG. 11, after entering the screen-off state, the mobile phone may play a corresponding screen-off animation A according to a current charge state and power information. After the playing of the screen-off animation A is over, the mobile phone may keep the last frame of image of the screen-off animation A displayed. Subsequently, the mobile phone may still obtain the latest charge state and power information in real time. If the mobile phone is in a not-in-charging state, the mobile phone may determine a level (that is, power level) of the mobile phone based on the latest power information. When the charge state of the mobile phone has changed or the power level of the mobile phone has changed, the mobile phone may play a corresponding screen-off animation B. The screen-off animation B is a screen-off animation corresponding to the latest charge state or power level of the mobile phone.

For example, if power information when the mobile phone enters the screen-off state is 21%, after the mobile phone enters the screen-off state, the corresponding third screen-off animation may be played first (that is, the screen-off animation A is the third screen-off animation). When it is detected that the power information of the mobile phone has dropped from 21% to 20%, the mobile phone may play the corresponding second screen-off animation (that is, the screen-off animation B is the second screen-off animation).

Alternatively, if power information when the mobile phone enters the screen-off state is 21%, after the mobile phone enters the screen-off state, the corresponding third screen-off animation may be played first (that is, the screen-off animation A is the third screen-off animation). When it is detected that the power information of the mobile phone has dropped from 21% to 20%, the last frame of image of the screen-off animation A may continue to be displayed until the mobile phone detects a touch operation input by the user when the mobile phone plays the corresponding second screen-off animation (that is, the screen-off animation B is the second screen-off animation).

Figure 12:
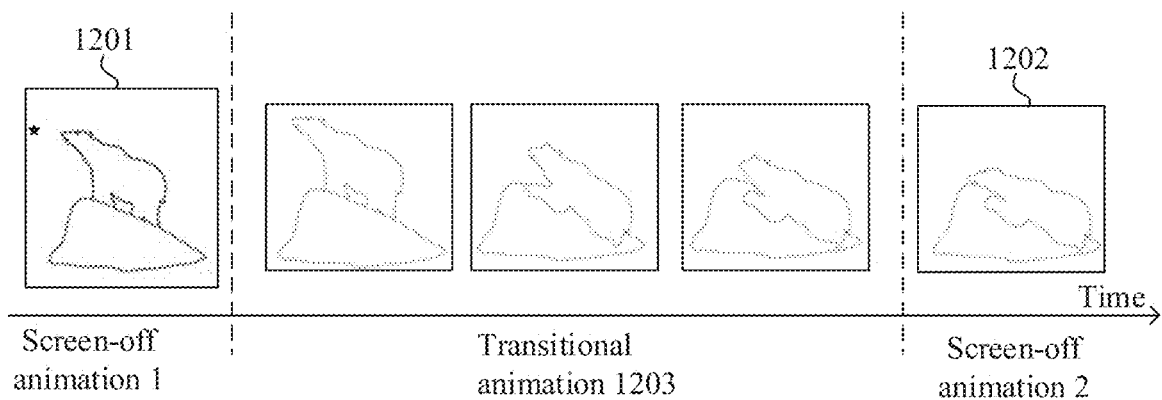
FIG. 12 is a sixth schematic diagram of an application scenario of an always on display method according to an embodiment of this application.

In some embodiments, if the first frame of image of the screen-off animation B is different from the last frame of image of the screen-off animation A, the mobile phone may play a corresponding transitional screen-off animation before playing the screen-off animation B. For example, as shown in FIG. 12, the mobile phone that has entered the screen-off state finishes playing the screen-off animation A and keeps an image 1201 displayed (that is, the last frame of image of the screen-off animation A is the image 1201). The image 1201 shows a polar bear standing on the ice. At this point, the power information of the mobile phone is 21%. When the power information of the mobile phone drops to 20%, the level of the power of the mobile phone changes from the second level to the first level. As shown in FIG. 12, the first frame of image of the screen-off animation B corresponding to the first level is an image 1202, which shows a polar bear lying prone on the ice. At this point, still as shown in FIG. 12, the mobile phone may play a transitional screen-off animation 1203 before playing the screen-off animation B. The first frame of image of the transitional screen-off animation 1203 may be the same or approximately the same as the last frame of image of the screen-off animation A, and the last frame of image of the transitional screen-off animation 1203 may be the same or approximately the same as the first frame of image of the screen-off animation B. In this way, when switching from the screen-off animation A to the screen-off animation B in the screen-off state, the mobile phone can play the transitional screen-off animation 1203 for soft transition, to prevent abrupt appearance of the screen-off animation B, and therefore improve the user's visual experience.

In some embodiments, still as shown in FIG. 11, when the mobile phone enters the screen-off state, the mobile phone can still receive and respond to a touch operation input by the user. For example, after the mobile phone finishes playing the screen-off animation A, if a touch operation input by the user is detected, the mobile phone may play the screen-off animation A again. Alternatively, after the mobile phone finishes playing the screen-off animation A, if a touch operation input by the user is detected, the mobile phone may first determine whether a current charge state or power level has changed. If the current charge state or power level has not changed, the mobile phone may play the screen-off animation A again. If the current charge state or power level has changed, the mobile phone may play the corresponding screen-off animation B. It can be understood that, the touch operation may be an operation such as knuckle tapping or stylus tapping, which is not limited in this embodiment of this application.

In other embodiments, as shown in FIG. 11, after the mobile phone enters the screen-off state, the mobile phone can not only respond to a touch operation input by the user, but also capture a facial image or an eye image of the user. For example, after the mobile phone enters the screen-off state, the mobile phone can invoke the camera to start acquiring an image. When a facial image or an eye image of the user is acquired, it indicates that the user's attention is probably being focused on the screen of the mobile phone. In this case, the mobile phone may play a corresponding interactive screen-off animation. A person or an animal in the interactive screen-off animation may present a state of interacting with the user in front of the screen.

Figure 13:
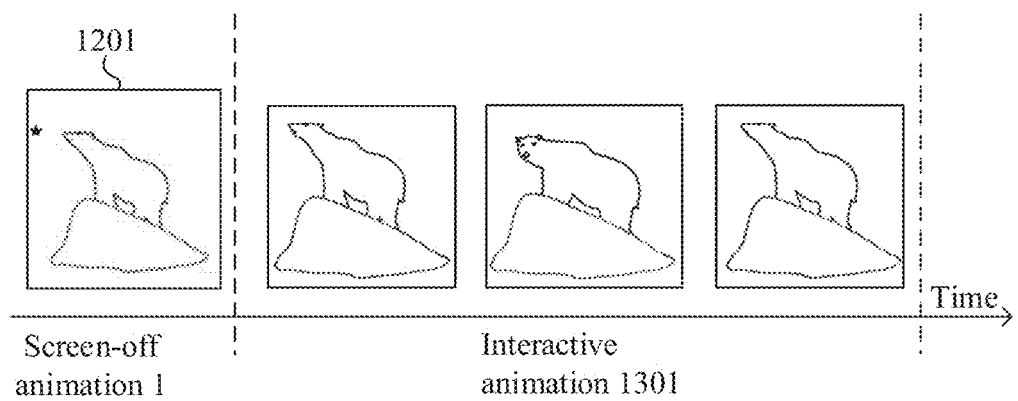
FIG. 13 is a seventh schematic diagram of an application scenario of an always on display method according to an embodiment of this application.

For example, as shown in FIG. 13, the mobile phone that has entered the screen-off state finishes playing the screen-off animation A and keeps an image 1201 displayed, where a polar bear in the image 1201 is standing on the ice. Subsequently, if a facial image or an eye image of the user is acquired, the mobile phone may play the corresponding interactive screen-off animation 1301. The first frame of image of the interactive screen-off animation 1301 may be the same or approximately the same as the image 1201, and the last frame of image of the interactive screen-off animation 1301 may also be the same or approximately the same as the image 1201. For example, still as shown in FIG. 13, the interactive screen-off animation 1301 may be a polar bear turning its head to look at the user and then turning back standing on the ice. In this way, by acquiring the facial image or eye image of the user, the mobile phone is triggered to play the interactive screen-off animation 1301 when the screen becomes off, thereby enhancing interaction and interest between the user and the mobile phone.

Exemplarily, after the mobile phone finishes playing the interactive screen-off animation 1301, the mobile phone may keep the last frame of image of the interactive screen-off animation 1301 displayed. An example is used that duration of the interactive screen-off animation 1301 is 3 s. If the mobile phone detects the facial image or eye image of the user again during playing of the interactive screen-off animation 1301 or when the playing of the interactive screen-off animation 1301 is over, the mobile phone may play the interactive screen-off animation 1301 again. Alternatively, the mobile phone may not respond to the facial image or eye image input by the user and not play the interactive screen-off animation 1301 again, so as to reduce power consumption of the mobile phone. Subsequently, when the mobile phone detects the facial image or eye image input by the user again, the mobile phone may play the interactive screen-off animation 1301 again.

Alternatively, after the playing of the interactive screen-off animation 1301 is over, the mobile phone may start a timer of a given duration (for example, 5 minutes). If the mobile phone detects the facial image or eye image input by the user before the timer expires, the mobile phone does not need to play the interactive screen-off animation 1301. Correspondingly, after the timer expires, if the mobile phone detects the facial image or eye image input by the user, the mobile phone may play the interactive screen-off animation 1301 again.

Alternatively, the mobile phone may further dynamically play a corresponding interactive screen-off animation according to duration of the facial image or eye image input by the user. For example, when detecting the facial image or eye image input by the user, the mobile phone may play the process of the polar bear turning its head to look at the user in the interactive screen-off animation 1301; when the user continues to input the facial image or eye image, the mobile phone may display the polar bear looking at the user as in the interactive screen-off animation 1301; and when the mobile phone detects that the facial image or eye image of the user has gone, the mobile phone may display the polar bear turning back standing on the ice as in the interactive screen-off animation 1301.

In addition, if the mobile phone detects a touch operation input by the user or detects a facial image or an eye image of the user during the playing of the screen-off animation A (or the screen-off animation B), the mobile phone may not respond and continue playing the screen-off animation A (or the screen-off animation B) being played, to avoid interrupting the screen-off animation being played.

Figure 14:
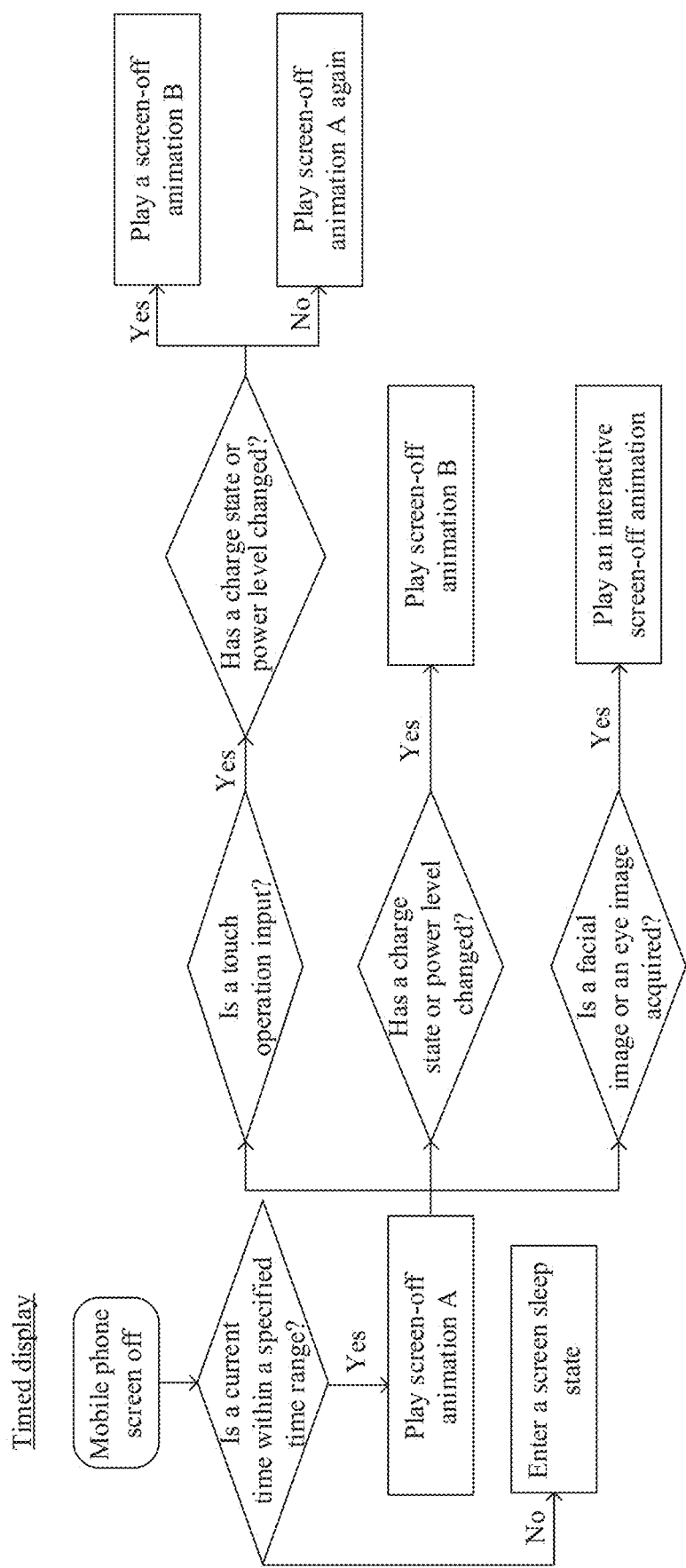
FIG. 14 is a fifth schematic flowchart of an always on display method according to an embodiment of this application.

In other embodiments, when the display mode of the always on display function is timed display, how mobile phone performs always on display is similar to the foregoing method. The difference lies in that, as shown in FIG. 14, when entering the screen-off state, the mobile phone may determine whether a current time is within the time range set by the user. If the current time is not within the time range set by the user, the mobile phone may enter a screen sleep state, without displaying the screen-off animation and like content. At this point, even if the mobile phone detects a touch operation input by the user, or a facial image or an eye image of the user, the mobile phone does not need to activate the always on display function to play the corresponding screen-off animation.

Correspondingly, if the current time is within the time range set by the user, the mobile phone may display the corresponding screen-off animation A according to a current charge state and power information using the method described in the foregoing embodiments. After the playing of the screen-off animation A is over, the mobile phone may keep the last frame of image of the screen-off animation A displayed. Subsequently, the mobile phone may still obtain the latest charge state and power information in real time. When the charge state or the power level of the mobile phone has changed, the mobile phone may display the corresponding screen-off animation B.

When the playing of the screen-off animation B is over, the mobile phone may keep the last frame of image of the screen-off animation B displayed, which is similar to the operation performed after the screen-off animation A is over. Further, the mobile phone may still obtain the latest charge state and power information in real time. If the charge state or power level of the mobile phone changes again, the mobile phone may play a corresponding screen-off animation C (which is not shown in FIG. 14). In addition, when the mobile phone is keeping the last frame of image of the screen-off animation B displayed, the mobile phone may also detect and respond to a touch operation input by the user, or a facial image or an eye image of the user according to the method in the foregoing embodiments. This is not limited in embodiments of this application.

Figure 15:
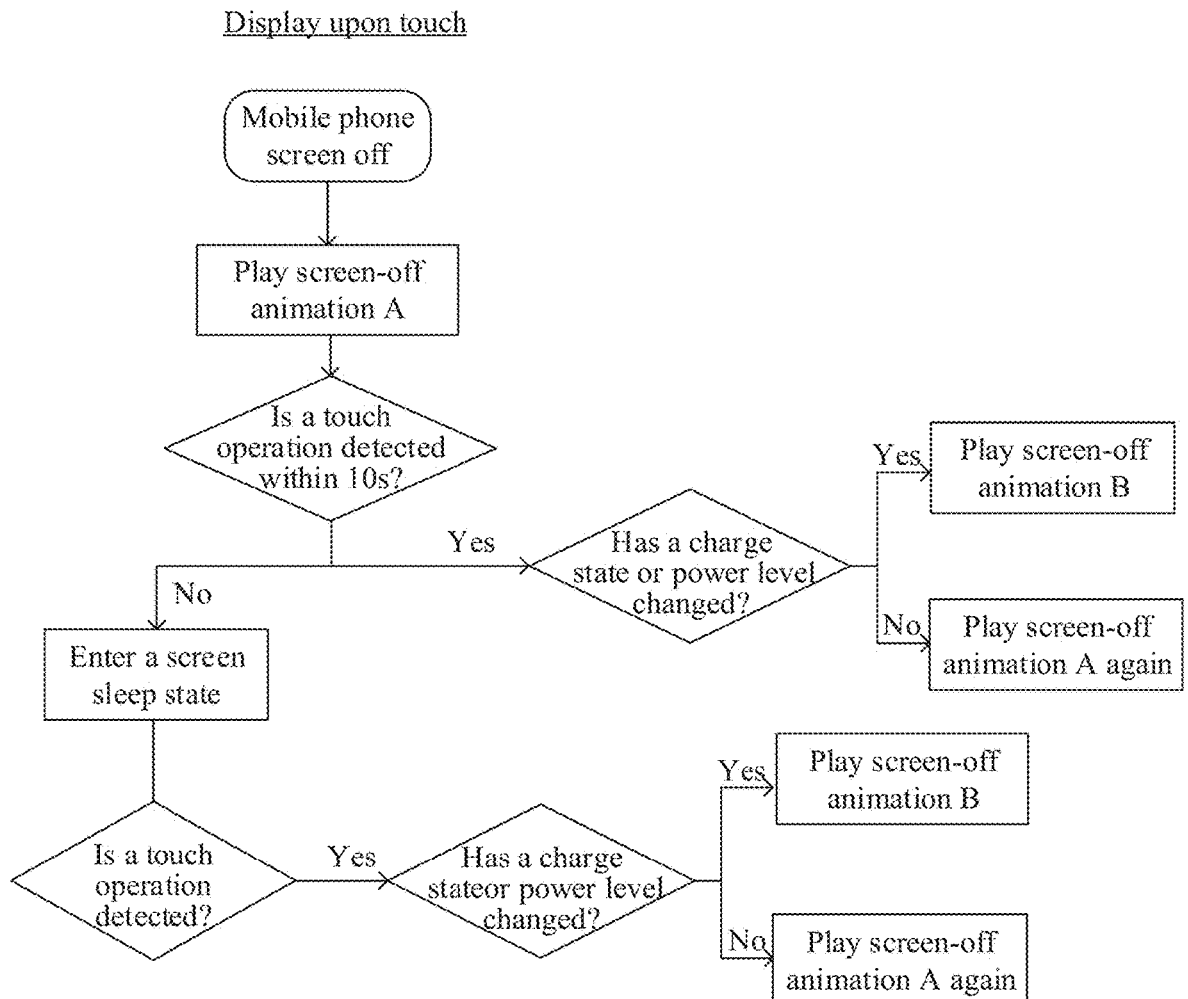
FIG. 15 is a sixth schematic flowchart of an always on display method according to an embodiment of this application.

In other embodiments, when the display mode of the always on display function is display upon touch, as shown in FIG. 15, after entering the screen-off state, the mobile phone may display the corresponding screen-off animation A according to a current charge state and power information. After the playing of the screen-off animation A is over, the mobile phone may keep the last frame of image of the screen-off animation A displayed. In addition, when the playing of the screen-off animation A is over, the mobile phone may start a preset timer 1. An example is used that duration of the timer 1 is 10 s. If the timer 1 expires, it indicates that no touch operation of the user is detected within the duration of 10 s. Then, the mobile phone may stop displaying the last frame of image of the screen-off animation A and enter a screen sleep state, to reduce power consumption of the mobile phone. Correspondingly, if a touch operation of the user is detected before the timer 1 expires, the mobile phone may obtain a latest charge state and power information, and determine a power level of the latest power information. If the current charge state or power level has not changed, the mobile phone may play the screen-off animation A again. If the current charge state or power level has changed, the mobile phone may play the corresponding screen-off animation B.

Different from the timed display mode, in the display upon touch mode, when the mobile phone enters the screen sleep state, the mobile phone can still receive and respond to a touch operation input by the user. For example, after the mobile phone enters the screen sleep state, if a touch operation input by the user is detected, the mobile phone may play the screen-off animation A again. Alternatively, still as shown in FIG. 15, after the mobile phone enters the screen sleep state, if a touch operation input by the user is detected, the mobile phone may obtain a latest charge state and power information, and determine a power level of the latest power information. If the current charge state or power level has not changed, the mobile phone may play the screen-off animation A again. If the current charge state or power level has changed, the mobile phone may play the corresponding screen-off animation B.

In addition, after the phone enters the screen sleep state, the mobile phone can still capture a facial image or an eye image of the user. Similar to the always on display method shown in FIG. 13, when a facial image or an eye image of the user is acquired, it indicates that the user's attention is probably being focused on the screen of the mobile phone. In this case, the mobile phone may play a corresponding interactive screen-off animation corresponding to the screen-off animation A, so that a person or an animal in the interactive screen-off animation can interact with the user in front of the screen.

In the foregoing embodiments, an example is used that the charge state or power information of the mobile phone is used as the usage data of the mobile phone, to illustrate how the mobile phone in the screen-off state displays a screen-off animation associated with the usage data. In other embodiments, the mobile phone may alternatively perform always on display dynamically according to other usage data (such as a user step count, whether music is being played, weather, or time).

Figure 16:
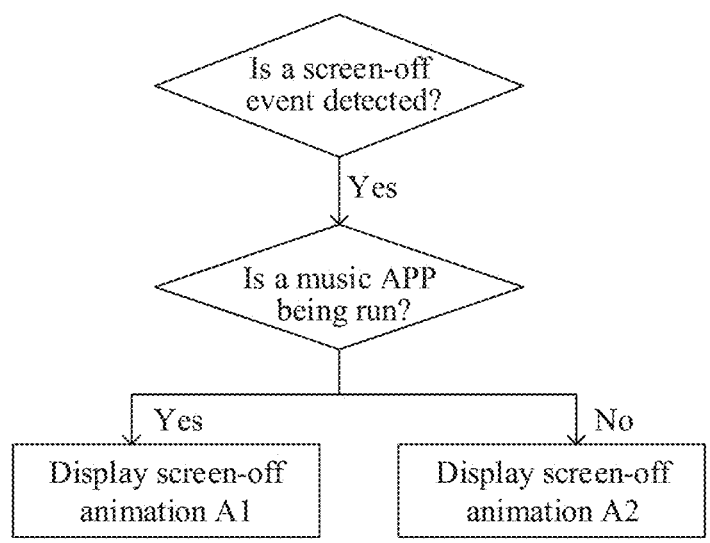
FIG. 16 is a seventh schematic flowchart of an always on display method according to an embodiment of this application.
Figure 17:
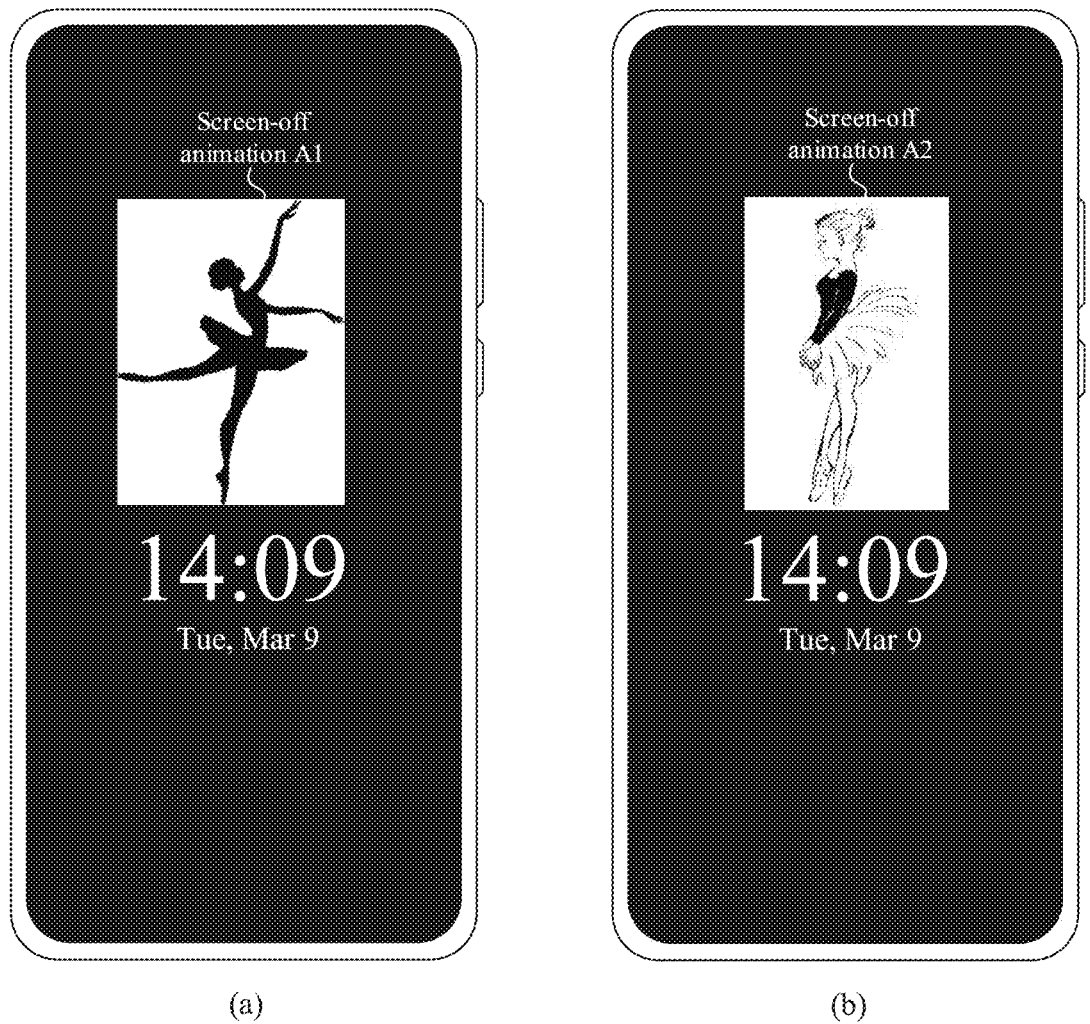
FIG. 17 is an eighth schematic diagram of an application scenario of an always on display method according to an embodiment of this application.

Exemplarily, as shown in FIG. 16, after the mobile phone detects a screen-off event, the mobile phone may check whether a music APP is being run. The music APP may run in the foreground or background of the mobile phone. If the mobile phone is running a music APP, a screen-off animation A1 associated with a state of music being played may be displayed after the mobile phone becomes screen off. For example, as shown in (a) in FIG. 17, the screen-off animation A1 may be a ballet dancer dancing. Correspondingly, if the mobile phone is running no music APP, a screen-off animation A2 associated with a state of no music being played may be displayed after the mobile phone becomes screen off. For example, as shown in (b) in FIG. 17, the screen-off animation A2 may present a state of the ballet dancer who has not started dancing. In this way, a user can vividly and visually know a current state of whether the mobile phone is playing music, through state changing of a person or an animal in the screen-off animation.

How specifically the mobile phone performs always on display according to whether a music APP is being run is the same as how specifically the mobile phone performs always on display according to the charge state or power information of the mobile phone as in the foregoing embodiments. Therefore, details are not described herein again.

Figure 18:
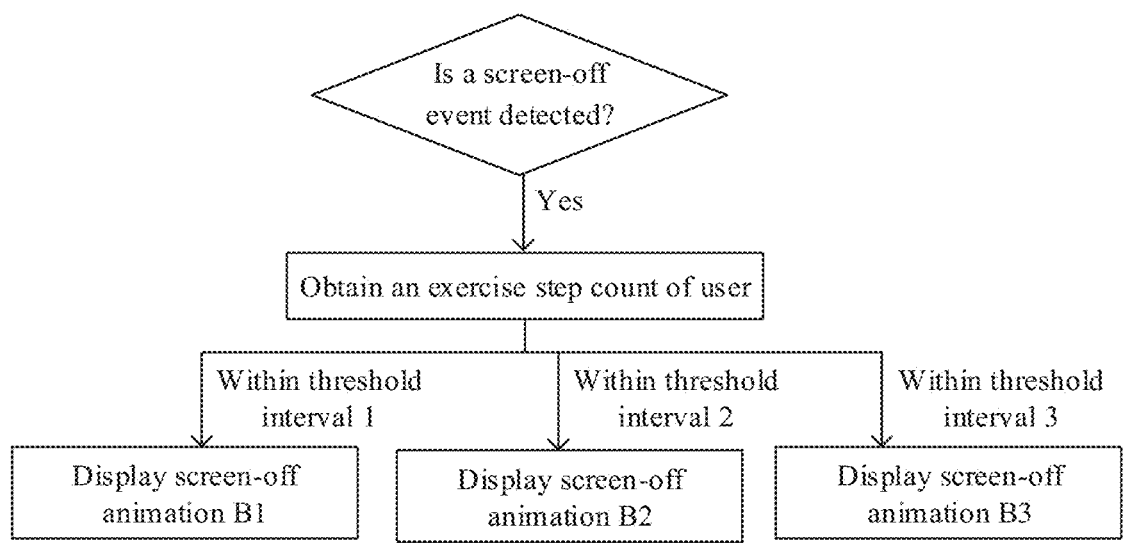
FIG. 18 is an eighth schematic flowchart of an always on display method according to an embodiment of this application.
Figure 19:
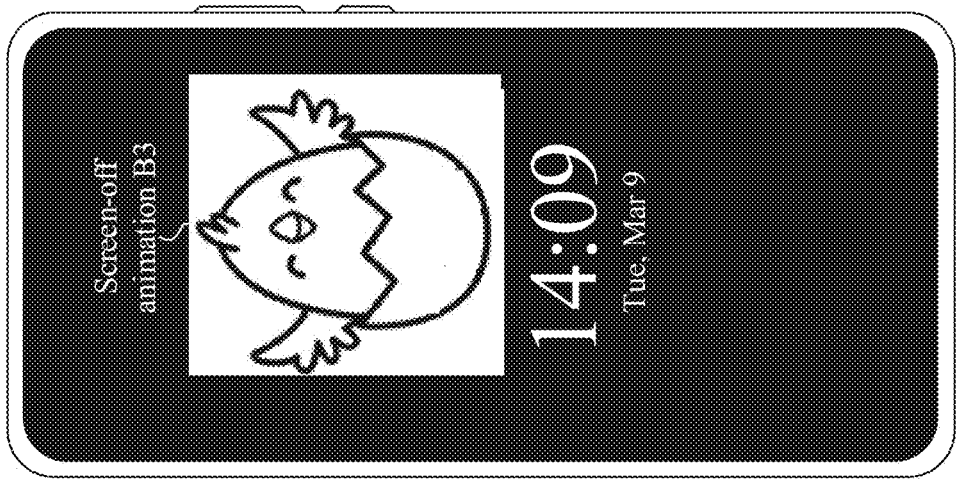
FIG. 19 is a ninth schematic diagram of an application scenario of an always on display method according to an embodiment of this application.
Figure 19:
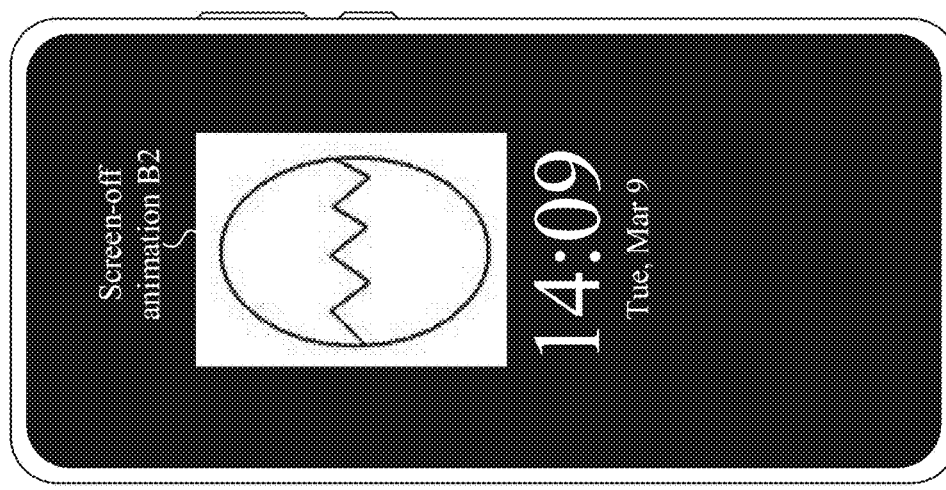
Figure 19:
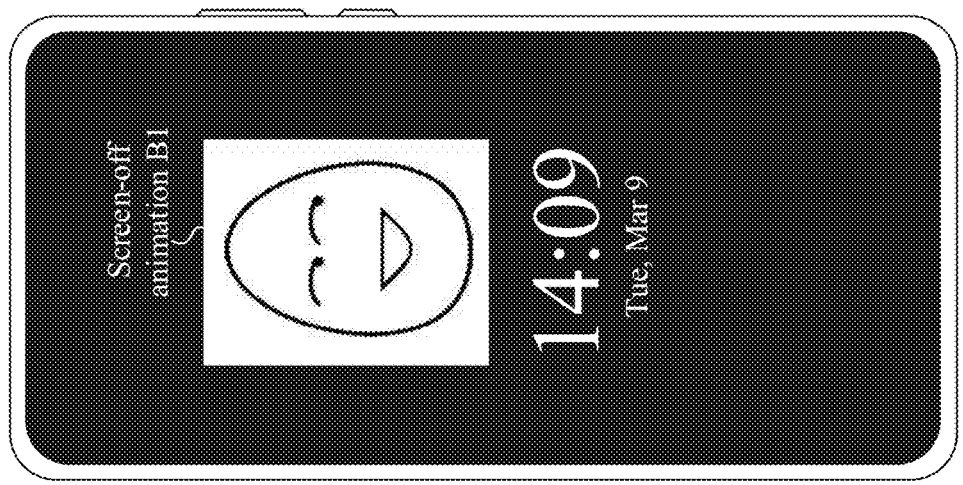

Exemplarily, as shown in FIG. 18, after detecting a screen-off event, the mobile phone may obtain a current exercise step count of the user. If the exercise step count of the user is within a threshold interval 1, a screen-off animation B1 corresponding to the threshold interval 1 may be displayed after the mobile phone becomes screen off. For example, as shown in (a) in FIG. 19, the screen-off animation B1 may be an early stage of egg hatching where the shell is still intact. If the exercise step count of the user is within a threshold interval 2 (whose minimum value is greater than or equal to a maximum value of threshold interval 1), a screen-off animation B2 corresponding to the threshold interval 2 may be displayed after the mobile phone becomes screen off. For example, as shown in (b) in FIG. 19, the screen-off animation B2 may be a middle stage of egg hatching where the shell has been broken. If the exercise step count of the user is within a threshold interval 3 (whose minimum value is greater than or equal to a maximum value of threshold interval 2), a screen-off animation B3 corresponding to the threshold interval 3 may be displayed after the mobile phone becomes screen off. For example, as shown in (c) in FIG. 19, the screen-off animation B3 may be a late stage of egg hatching, where a chick has come out of the egg shell. In this way, the user can vividly and visually learn a current user step count from changing of a person or an animal in the screen-off animation.

How specifically the mobile phone performs always on display according to the exercise step count of the user is the same as how the mobile phone specifically performs always on display according to the charge state or power information as in the foregoing embodiments. Therefore, details are not described herein again.

Certainly, apart from using the exercise step count of the user and whether the mobile phone is running a music APP as usage data of the mobile phone for always on display, the mobile phone may alternatively perform always on display according to other usage data. This is not limited in the embodiments of this application. For example, the mobile phone may obtain current weather information after detecting a screen-off event, and then display a differentiated screen-off animation according to the current weather information. For another example, the mobile phone may obtain current temperature information after detecting a screen-off event, and then display a differentiated screen-off animation according to the current temperature information.

In some other embodiments, the mobile phone may also perform always on display in combination with various types of usage data of mobile phone. For example, the mobile phone may perform always on display by combining current power information and whether a music APP is being run, so as to convey to the user through the screen-off animation current usage status of the mobile phone including power of the mobile phone and whether music is being played.

Figure 20:
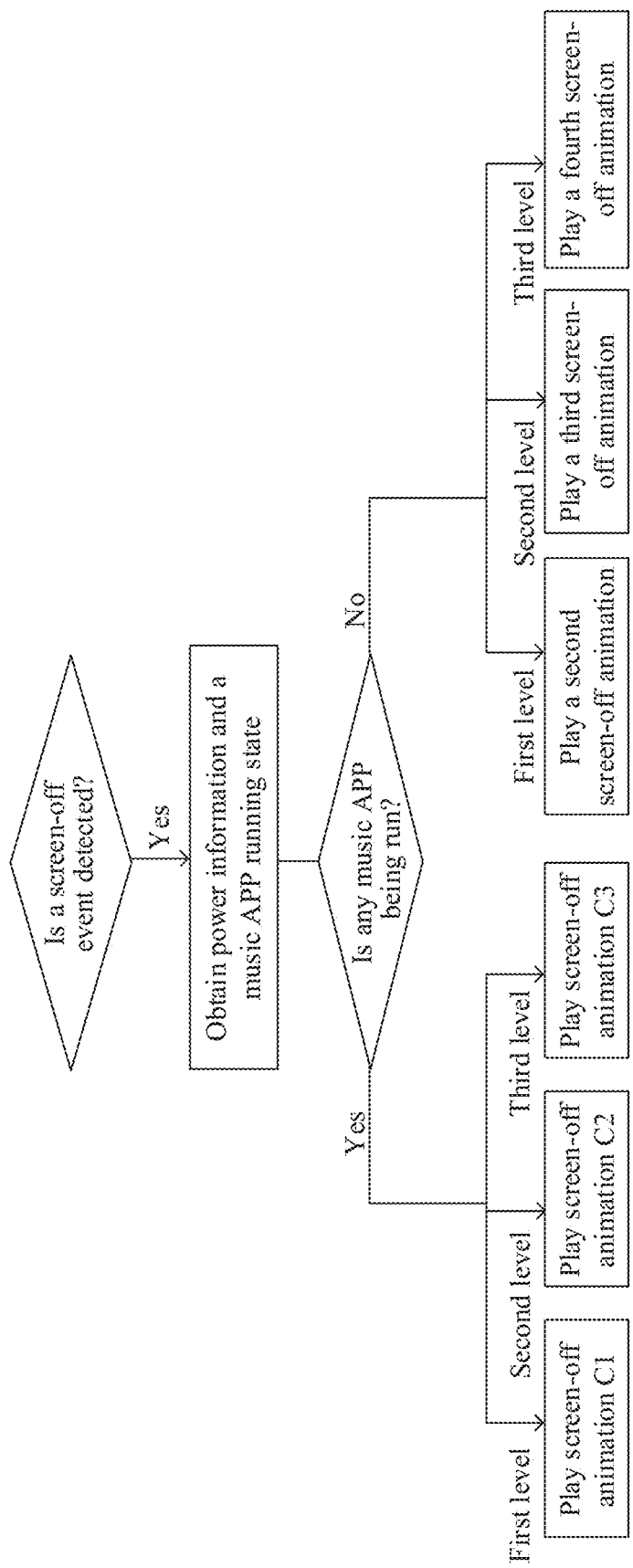
FIG. 20 is a ninth schematic flowchart of an always on display method according to an embodiment of this application.
Figure 21:
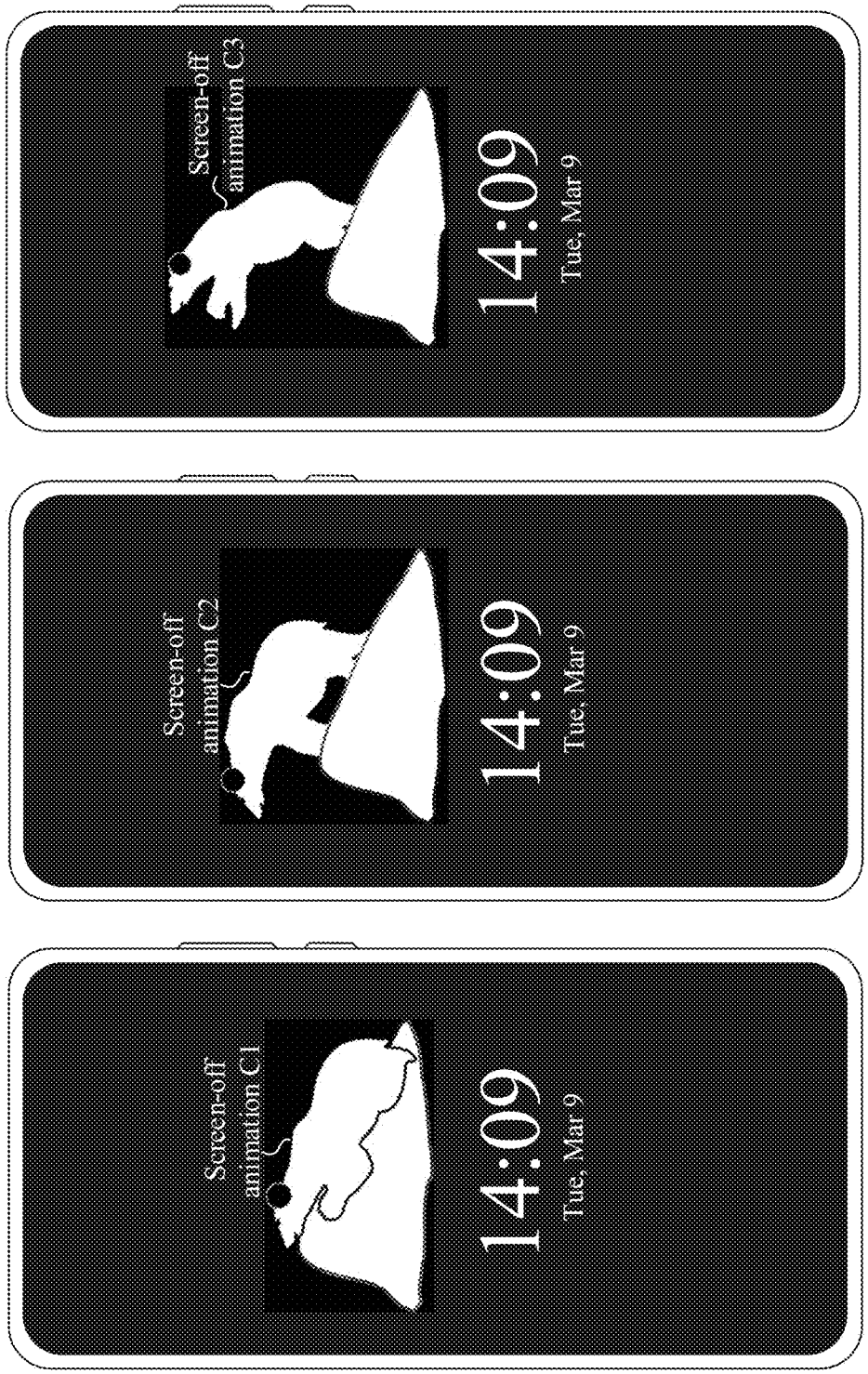
FIG. 21 is a tenth schematic diagram of an application scenario of an always on display method according to an embodiment of this application.

Exemplarily, as shown in FIG. 20, after detecting a screen-off event, the mobile phone may obtain the current power information and a music APP running state. Then, if the power information of the mobile phone is at the first level and the mobile phone is running a music APP, a screen-off animation C1 may be played after the mobile phone becomes screen off. As shown in (a) in FIG. 21, the screen-off animation C1 is similar to the second screen-off animation shown in FIG. 7 except that the polar bear in the screen-off animation C1 is wearing an earphone, so as to convey information to the user that current power is low and that the music APP is being run. Correspondingly, if the power information of the mobile phone is at the first level but the mobile phone is running no music APP, it is only necessary to convey information to the user that the current power is low. Then the second screen-off animation shown in FIG. 7 may be played after the mobile phone becomes screen off.

Still as shown in FIG. 20, if the power information of the mobile phone is at the second level and the mobile phone is running a music APP, a screen-off animation C2 may be played after the mobile phone becomes screen off. As shown in (b) in FIG. 21, the screen-off animation C2 is similar to the third screen-off animation shown in FIG. 8, except that the polar bear in the screen-off animation C2 is wearing an earphone, so as to convey information to the user that the current power is medium and that a music APP is being run. Correspondingly, if the power information of the mobile phone is at the second level but the mobile phone is running no music APP, it is only necessary to convey information to the user that the current power is medium. Then the third screen-off animation shown in FIG. 8 may be played after the mobile phone becomes screen off.

Still as shown in FIG. 20, if the power information of the mobile phone is at the third level and the mobile phone is running a music APP, a screen-off animation C3 may be played after the mobile phone becomes screen off. As shown in (c) in FIG. 21, the screen-off animation C3 is similar to the fourth screen-off animation shown in FIG. 9 except that the polar bear in the screen-off animation C3 is wearing an earphone, so as to convey information to the user that the current power is high and that a music APP is being run. Correspondingly, if the power information of the mobile phone is at the third level but the mobile phone is running no music APP, it is only necessary to convey information to the user that the current power is high. Then the fourth screen-off animation shown in FIG. 9 may be played after the mobile phone becomes screen off.

Although the foregoing embodiments are described by using an example that the mobile phone performs always on display by combining two types of usage data, current power information and whether the mobile phone is running a music APP, it can be understood that the mobile phone may alternatively combine other usage data to perform always on display, which is not limited in the embodiments of this application. For example, the mobile phone may alternatively perform always on display by combining current power information and a current time. If the current time is daytime, the background of a screen-off animation displayed by the mobile phone combined with the current power information may be daytime; if the current time is at night, the background of a screen-off animation displayed by the mobile phone combined with the current power information may be a starry sky.

Figure 22:
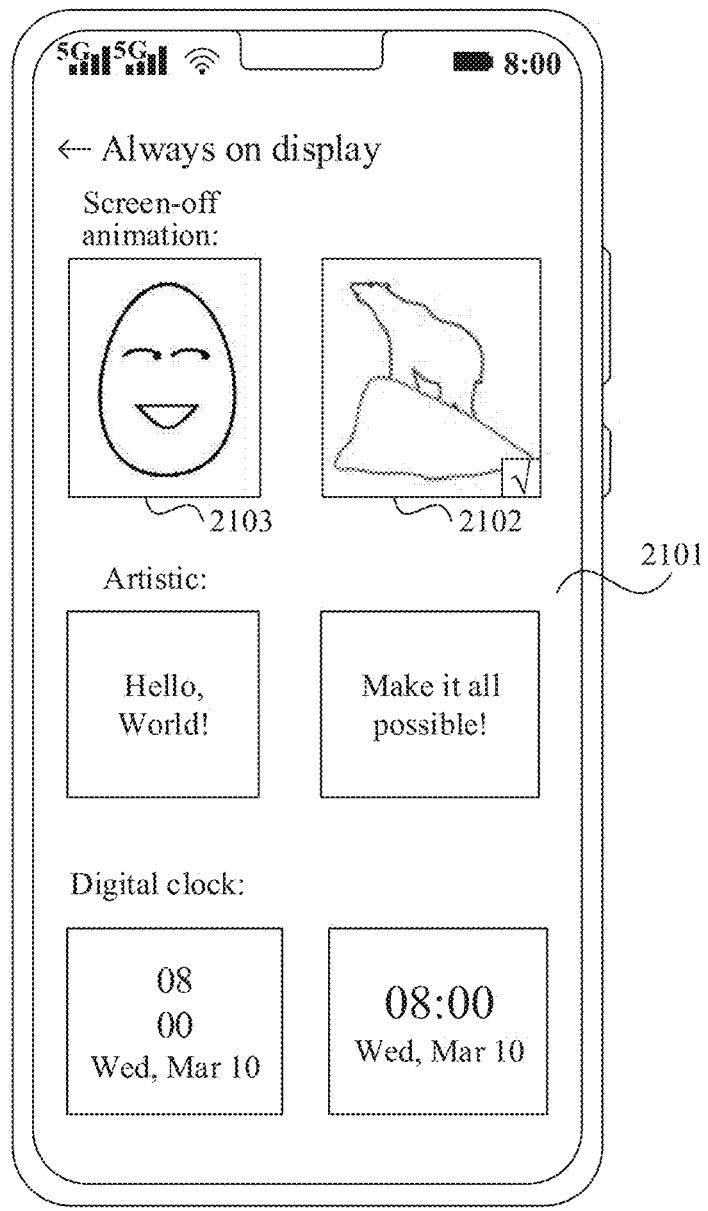
FIG. 22 is an eleventh schematic diagram of an application scenario of an always on display method according to an embodiment of this application.

In some other embodiments, an option of the always on display function is provided in a setting APP of the mobile phone. After the user enables the always on display option, the mobile phone can start to use the always on display function. As shown in FIG. 22, the mobile phone can display selectable themes of screen-off animations in a setting screen 2101 of the always on display function. For example, the setting screen 2101 includes a display theme 2102 of polar bear, a display theme 2103 of chick hatching, and a display theme of bear dancing (which is not shown in FIG. 22). Exemplarily, the display theme 2102 of polar bear may be associated with the charge state and the power information of the mobile phone; the display theme 2103 of chick hatching may be associated with the exercise step count of the user; and the display theme of bear dancing may be associated with whether the mobile phone is running a music APP.

If the user selects the display theme 2102 of polar bear, the mobile phone may obtain the current charge state and power information. Then, as shown in (a) in FIG. 23, if the mobile phone is in an in-charging state, the mobile phone may play the first screen-off animation shown in FIG. 6 in a preview screen 2201 of the display theme 2102. Correspondingly, if the mobile phone is in a not-in-charging state, as shown in (b) in FIG. 23, when the power information of the mobile phone is at the first level, the mobile phone may play the second screen-off animation shown in FIG. 7 in the preview screen 2201 of the display theme 2102. As shown in (c) in FIG. 23, if the power information of the mobile phone is at the second level, the mobile phone may play the third screen-off animation shown in FIG. 8 in the preview screen 2201 of the display theme 2102. As shown in (d) in FIG. 23, if the power information of the mobile phone is at the third level, the mobile phone may play the fourth screen-off animation shown in FIG. 9 in the preview screen 2201 of the display theme 2102. In this way, with the always on display function enabled, the user can perceive dynamic association between the screen-off animation and the current charge state and power information from the screen-off animation played in the preview screen 2201.

Figure 23:
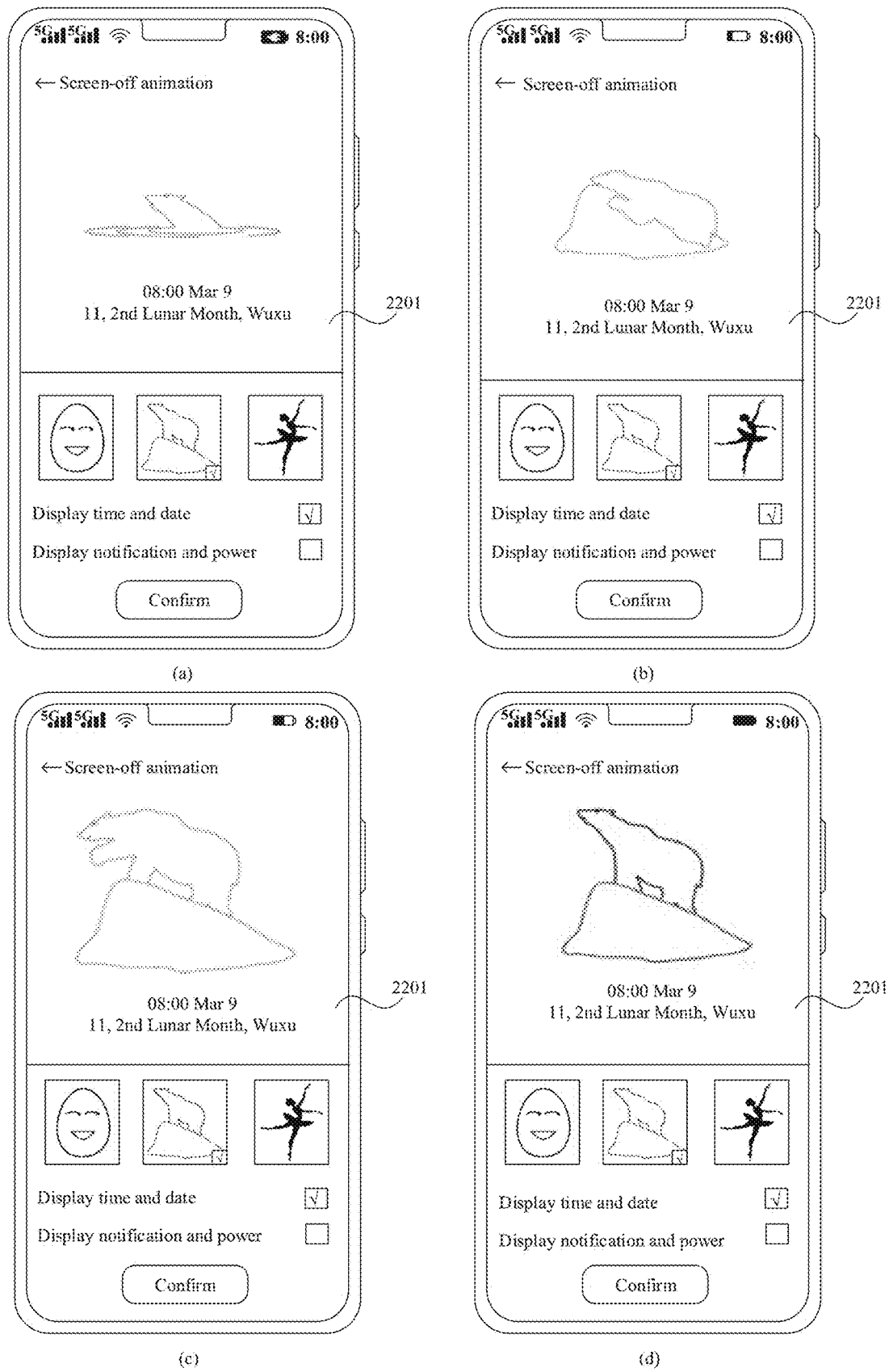
FIG. 23 is a twelfth schematic diagram of an application scenario of an always on display method according to an embodiment of this application.

Certainly, as shown in (a) to (d) in FIG. 23, the preview screen 2201 may further include setting options for display modes and specific display content (for example, whether to display time and date, or whether to display notification and power). This is not limited in the embodiments of this application.

In addition, the foregoing embodiments are described by using an example that the user selects the display theme 2102 of polar bear. It can be understood that if the user selects another display theme, for example, the display theme 2103 of chick hatching or the display theme 2104 of bear dancing, the mobile phone may also display the screen-off animation associated with the current usage data of the mobile phone on the corresponding preview screen according to the foregoing method. In this way, the user can perceive dynamic association between the screen-off animation and the current usage data of the mobile phone when setting the always on display function.

It should be noted that, although the foregoing embodiments are described by using an example that a mobile phone performs always on display, it can be understood that the foregoing always on display method may also be applied to electronic devices such as vehicle-mounted devices, tablet computers, and watches, and all these devices can be used to implement the always on display method in the foregoing embodiments. This is not limited in the embodiments of this application.

Figure 24:
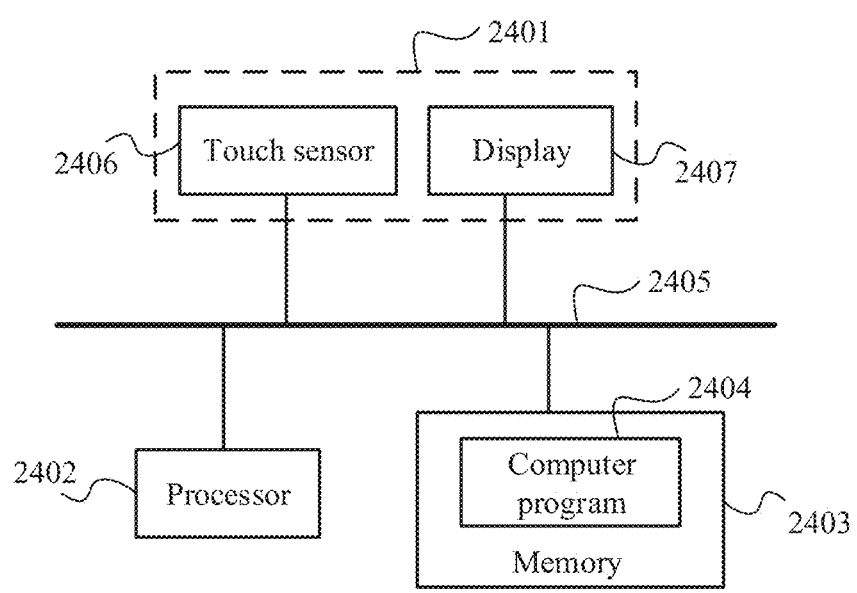
FIG. 24 is a second schematic structural diagram of an electronic device according to an embodiment of this application.

As shown in FIG. 24, an embodiment of this application discloses an electronic device, and the electronic device may be the above-mentioned mobile phone. The electronic device may specifically include: a touchscreen 2401, where the touchscreen 2401 includes a touch sensor 2406 and a display 2407; one or more processors 2402; a memory 2403; one or more application programs (not shown); and one or more computer programs 2404. These various components may be connected via one or more communication buses 2405. The one or more computer programs 2404 are stored in the memory 2403 and are configured to be executed by the one or more processors 2402. The one or more computer programs 2404 include instructions, which can be used to perform the steps in the foregoing embodiments.

From the description of the foregoing embodiments, persons skilled in the art can clearly understand that, for ease and conciseness of description, only the division into the foregoing functional modules is used as an example. In practice, the foregoing functions may be allocated to be completed by different functional modules as required, that is, an internal structure of the apparatus is divided into different functional modules to complete all or some of the functions described above. For specific working processes of the system, apparatus, and units described above, refer to the corresponding processes in the foregoing method embodiments. Details are not described herein again.

Functional units in the embodiments of this application may be integrated into one processing unit, or each of the units may exist alone physically, or two or more units are integrated into one unit. Such integrated unit may be implemented in a form of hardware or in a form of a software functional unit.

If implemented in the form of a software functional unit and sold or used as a stand-alone product, the integrated unit may be stored in a computer-readable storage medium. Based on such understanding, the technical solutions of the embodiments of this application, in essence or the part contributing to the prior art, or some or all of the technical solutions may be embodied in a form of a software product. Such computer software product is stored on a storage medium, and includes several instructions to cause a computer device (which may be a personal computer, a server, or a network device) to perform all or some steps of the methods according to the embodiments of this application. The foregoing storage medium includes various media capable of storing program code, such as a flash memory, a removable hard disk, a read-only memory, a random access memory, a magnetic disk, or an optical disc.

The foregoing descriptions are merely specific implementations of the embodiments of this application and the protection scope of the embodiments of this application is not limited thereto. Any modification or replacement within the technical scope disclosed in the embodiments of this application shall fall within the protection scope of the embodiments of this application. Therefore, the protection scope of the embodiments of this application should be subject to the protection scope of the claims.

What is claimed is:

1. An always on display method, comprising:
when power of an electronic device is first power, in response to a first screen-off event, playing, by the electronic device, a first screen-off animation and keeping a first screen-off image displayed, wherein the first screen-off image is a last frame of the first screen-off animation;

keeping, by the electronic device, the first screen-off image displayed until the power of the electronic device is second power, wherein the second power is lower than the first power;

when the power of the electronic device is the second power, in response to a second screen-off event, playing, by the electronic device, the first screen-off animation and keeping the first screen-off image displayed;

keeping, by the electronic device, the first screen-off image displayed until the power of the electronic device is third power, wherein the third power is lower than the second power;

when the power of the electronic device is the third power, playing, by the electronic device, a second screen-off animation and keeping, by the electronic device, a second screen-off image displayed, wherein the second screen-off image is a last frame of the second screen-off animation, wherein the first frame of the second screen-off animation is the same as the first screen-off image, and the first frame of the second screen-off animation is different from the second screen-off image;

keeping, by the electronic device, the second screen-off image displayed until the power of the electronic device is fourth power, wherein the fourth power is lower than the third power; and when the power of the electronic device is the fourth power, in response to a third screen-off event, playing, by the electronic device, a third screen-off animation and keeping a third screen-off image displayed, wherein the third screen-off image is a last frame of the third screen-off animation, and wherein the first frame of the third screen-off animation is the same as the second screen-off image;

wherein an animation object in the first screen-off animation is the same as an animation object in the second screen-off animation; and wherein a moving speed of the animation object in the second screen-off animation is lower than a moving speed of an animation object in the third screen-off animation, or a moving range of the animation object in the second screen-off animation is smaller than a moving range of the animation object in the third screen-off animation.

2. The method according to claim 1, further comprising:
when displaying the first screen-off image, detecting, by the electronic device, a touch operation; and
in response to the touch operation, displaying, by the electronic device, an interactive screen-off animation.

3. The method according to claim 2, wherein a first frame of the interactive screen-off animation is the same as the first screen-off image.

4. The method according to claim 2, wherein a last frame of image of the interactive screen-off animation is the same as the first screen-off image.

5. The method according to claim 1, further comprising:
when the electronic device displays the first screen-off image or the second screen-off image, in response to charging, automatically playing, by the electronic device, a charging screen-off animation.

6. The method according to claim 1, wherein the screen-off event is an event that a power button is pressed while a screen of the electronic device is on, or an event that no user operation is detected within a time period while the screen of the electronic device is on.

7. The method according to claim 1, wherein the power of the electronic device comprises a plurality of power levels, wherein the first power and the second power are at a first power level of the plurality of power levels, and wherein the third power is at a second power level of the plurality of power levels.

8. The method according to claim 1, wherein after the keeping, by the electronic device, the first screen-off image displayed, or after the keeping, by the electronic device, the second screen-off image displayed, or after the keeping, by the electronic device, the third screen-off image displayed, the method further comprises:
when the electronic device detects a touch operation by a user or acquires a facial image or an eye image of a user, playing, by the electronic device, an interactive screen-off animation, wherein an animation object in the interactive screen-off animation presents a state of interacting with the user.

9. The method according to claim 1, wherein after the electronic device enters a screen-off state, the method further comprises:
displaying, by the electronic device, one or more of a time, a date, a power amount, or a notification.

10. The method according to claim 1, wherein the first screen-off animation, the second screen-off animation, and the third screen-off animation are associated with one or more of a user step count, weather, temperature, or an application running on the electronic device.

11. An electronic device, comprising:
a touchscreen comprising a touch sensor and a display;
one or more processors; and
a memory, wherein the memory stores one or more computer programs comprising instructions, and when the instructions are executed by the one or more processors, the electronic device is enabled to perform:
when power of an electronic device is first power, in response to a first screen-off event, playing a first screen-off animation on the display and keeping a first screen-off image displayed, wherein the first screen-off image is a last frame of the first screen-off animation;

keeping the first screen-off image displayed until the power of the electronic device is second power, wherein the second power is lower than the first power;

when the power of the electronic device is the second power, in response to a second screen-off event, playing the first screen-off animation on the display and keeping the first screen-off image displayed;

keeping the first screen-off image displayed until the power of the electronic device is third power, wherein the third power is lower than the second power;

when the power of the electronic device is the third power, playing a second screen-off animation on the display and keeping a second screen-off image displayed, wherein the second screen-off image is a last frame of the second screen-off animation, wherein the first frame of the second screen-off animation is the same or approximately the same as the first screen-off image, and the first frame of the second screen-off animation is different from the second screen-off image;

keeping the second screen-off image displayed until the power of the electronic device is fourth power, wherein the fourth power is lower than the third power; and when the power of the electronic device is the fourth power, in response to a third screen-off event, playing, by the electronic device, a third screen-off animation on the display and keeping a third screen-off image displayed, wherein the third screen-off image is a last frame of the third screen-off animation, and wherein the first frame of the third screen-off animation is the same as the second screen-off image;

wherein an animation object in the first screen-off animation is the same as an animation object in the second screen-off animation; and wherein a moving speed of the animation object in the second screen-off animation is lower than a moving speed of an animation object in the third screen-off animation, or a moving range of the animation object in the second screen-off animation is smaller than a moving range of the animation object in the third screen-off animation.

12. The electronic device according to claim 11, wherein the instructions, when executed by the one or more processors, further cause the electronic device to perform:

when displaying the first screen-off image, detecting a touch operation on the touch sensor; and in response to the touch operation, displaying an interactive screen-off animation.

13. The electronic device according to claim 12, wherein a first frame of the interactive screen-off animation is the same as the first screen-off image.

14. The electronic device according to claim 12, wherein a last frame of the interactive screen-off animation is the same as the first screen-off image.

15. The electronic device according to claim 11, wherein the instructions, when executed by the one or more processors, further cause the electronic device to perform:

when the electronic device displays the first screen-off image or the second screen-off image, in response to charging, automatically playing a charging screen-off animation on the display.

16. The electronic device according to claim 11, wherein the screen-off event is an event that a power button is pressed while a screen of the electronic device is on, or an event that no user operation is detected within a time period while the screen of the electronic device is on.

17. The electronic device according to claim 11, wherein the power of the electronic device comprises a plurality of power levels, wherein the first power and the second power are at a first power level of the plurality of power levels, and the third power is at a second power level of the plurality of power levels.

18. A non-transitory computer-readable storage medium storing instructions that, when executed by one or more processors, cause an electronic device to perform operations comprising:

when power of an electronic device is first power, in response to a first screen-off event, playing a first screen-off animation and keeping a first screen-off image displayed, wherein the first screen-off image is a last frame of the first screen-off animation;

keeping the first screen-off image displayed until the power of the electronic device is second power, wherein the second power is lower than the first power;

when the power of the electronic device is the second power, in response to a second screen-off event, playing the first screen-off animation and keeping the first screen-off image displayed;

keeping the first screen-off image displayed until the power of the electronic device is third power, wherein the third power is lower than the second power;

when the power of the electronic device is the third power, playing a second screen-off animation and keeping a second screen-off image displayed, wherein the second screen-off image is a last frame of the second screen-off animation, wherein the first frame of the second screen-off animation is the same or approximately the same as the first screen-off image, and the first frame of the second screen-off animation is different from the second screen-off image;

keeping the second screen-off image displayed until the power of the electronic device is fourth power, wherein the fourth power is lower than the third power; and when the power of the electronic device is the fourth power, in response to a third screen-off event, playing a third screen-off animation and keeping a third screen-off image displayed, wherein the third screen-off image is a last frame of the third screen-off animation, and wherein the first frame of the third screen-off animation is the same or approximately the same as the second screen-off image;

wherein an animation object in the first screen-off animation is the same as an animation object in the second screen-off animation; and wherein a moving speed of the animation object in the second screen-off animation is lower than a moving speed of an animation object in the third screen-off animation, or a moving range of the animation object in the second screen-off animation is smaller than a moving range of the animation object in the third screen-off animation.

19. The non-transitory computer-readable storage medium according to claim 18, the operations further comprising:

when displaying the first screen-off image, detecting a touch operation; and in response to the touch operation, displaying an interactive screen-off animation.

20. The non-transitory computer-readable storage medium according to claim 19, wherein a first frame of the interactive screen-off animation is the same as the first screen-off image.

* * * * *

UNITED STATES PATENT AND TRADEMARK OFFICE
CERTIFICATE OF CORRECTION

| | |
|---|---|
| PATENT NO. | : 12,045,536 B2 |
| APPLICATION NO. | : 18/299496 |
| DATED | : July 23, 2024 |
| INVENTOR(S) | : Zhang et al. |

It is certified that error appears in the above-identified patent and that said Letters Patent is hereby corrected as shown below:

On the Title Page

Applicant (71): "Honor Device Co., Ltd., Guangdong (CN)" should read -- Honor Device Co., Ltd., Shenzhen (CN) --.

Signed and Sealed this
Third Day of September, 2024

*Katherine Kelly Vidal*

Katherine Kelly Vidal
*Director of the United States Patent and Trademark Office*